United States Patent
Kumar et al.

(10) Patent No.: US 10,222,933 B2
(45) Date of Patent: Mar. 5, 2019

(54) SYSTEM AND METHOD FOR MANAGING MULTIPLE INTERACTIONS

(71) Applicant: Genesys Telecommunications Laboratories, Inc., Daly City, CA (US)

(72) Inventors: Praphul Kumar, Falls Church, VA (US); Ashish Thakkar, Brampton (CA); Leonid Vymenets, Toronto (CA); Herbert Ristock, Walnut Creek, CA (US)

( * ) Notice: Subject to any disclaimer, the term of this patent is extended or adjusted under 35 U.S.C. 154(b) by 208 days.

(21) Appl. No.: 14/726,510

(22) Filed: May 30, 2015

(65) Prior Publication Data

US 2016/0349960 A1    Dec. 1, 2016

(51) Int. Cl.
| | |
|---|---|
| G06F 3/00 | (2006.01) |
| G06F 3/0481 | (2013.01) |
| H04M 1/725 | (2006.01) |
| H04M 3/51 | (2006.01) |

(52) U.S. Cl.
CPC .... *G06F 3/04817* (2013.01); *H04M 1/72522* (2013.01); *H04M 3/5133* (2013.01); *H04M 3/5141* (2013.01); *H04M 3/5158* (2013.01); *H04M 2201/42* (2013.01); *H04M 2242/08* (2013.01)

(58) Field of Classification Search
CPC .... H04L 51/04; G06Q 10/10; G06F 17/30011
USPC .................................................. 715/752, 753
See application file for complete search history.

(56) References Cited

U.S. PATENT DOCUMENTS

| | | | | |
|---|---|---|---|---|
| 6,789,105 B2* | 9/2004 | Ludwig | ................. | G06Q 10/10 709/204 |
| 7,072,940 B1* | 7/2006 | Day | ..................... | G06Q 10/10 707/999.01 |
| 2006/0053380 A1* | 3/2006 | Spataro | ............ | G06F 17/30011 715/753 |
| 2012/0260217 A1* | 10/2012 | Celebisoy | ........... | G06F 3/04815 715/836 |
| 2013/0332840 A1* | 12/2013 | Roth | ..................... | G06F 3/0481 715/738 |
| 2014/0282083 A1* | 9/2014 | Gaetano, Jr. | ............ | H04L 51/04 715/752 |

* cited by examiner

*Primary Examiner* — Andrey Belousov

(57) ABSTRACT

A system for managing interactions includes: a processor; and a memory, wherein the memory stores instructions that, when executed by the processor, cause the processor to: identify first and second interactions by a user device, each of the first and second interactions being configured to alternately occupy a first area of a display screen of the user device; display an icon on the first area, the icon representing the second interaction, wherein attributes of the icon correspond to attributes of the second interaction; and modify the attributes of the icon based on a status of the second interaction.

20 Claims, 62 Drawing Sheets

SYSTEM AND METHOD FOR MANAGING MULTIPLE INTERACTIONS

FIELD

Aspects of embodiments of the present invention relate to systems and methods for managing multiple interactions from a device with limited real estate for displaying the interactions.

BACKGROUND

Mobile end user devices such as smart phones and electronic tablets allow users to manage a variety of interactions such as voice calls, chats, and emails, via a user interface. A user may utilize different aspects of the user interface to manage different types of interactions. Because of their compact size, many mobile devices have smaller display screens that provide limited real estate for displaying a user's options for managing interactions. This can limit the number of options available to a user who has multiple ongoing (or active) interactions. For example, an agent in a contact center may desire to handle voice calls, chats, and emails concurrently via his or her mobile device. It is desirable that the agent handles all interactions in a way that can achieve certain Key Performance Indicators (KPIs) set by the contact center. Such KPIs may include, for example, average wait time, interaction duration, escalations, repeat callers, service levels, and the like. However, due to the limited real estate available on her mobile device screen, the agent may be limited in the number and type of interactions that she can handle at one time. Thus, what is desired is a system and method for managing multiple interactions using a mobile device, in an optimal and efficient manner.

SUMMARY

Embodiments of the present invention are directed to a system and method for managing multiple interactions using a mobile device. According to one embodiment, the method includes: identifying, by one or more processors, first and second interactions by a user device, each of the first and second interactions being configured to alternately occupy a first area of a display screen of the user device; displaying, by the one or more processors, an icon on the first area, the icon representing the second interaction, and attributes of the icon correspond to attributes of the second interaction; and modifying, by the one or more processors, the attributes of the icon based on a status of the second interaction.

According to one embodiment, the attributes of the icon include at least one of a color, size, shape, orientation, position, and a dynamic movement feature of the icon on the display screen.

According to one embodiment, the status is based on a Key Performance Indicator (KPI).

According to one embodiment, the method further includes displaying, by the one or more processors, movement of the icon based on progress of the second interaction relative to the KPI.

According to one embodiment, the KPI relates to at least one of a wait time threshold, interaction duration, and service levels.

According to one embodiment, a graphical presentation of the icon is transparent and the displaying the icon on the first area includes displaying the icon on the first area while the first interaction occupies the first area.

According to one embodiment, the attributes of the icon correspond to a priority level of the second interaction.

According to one embodiment, the method further includes transferring, by the one or more processors, the second interaction to a user in response to a drag-and-drop action being performed on the icon.

According to one embodiment, a graphical presentation of the icon includes a button for activating the embedded control.

According to one embodiment, the method further includes retrieving, by the one or more processors, an interaction object associated with the icon in response to dropping of the icon by a user.

These and other features, aspects and advantages of the present invention will be more fully understood when considered with respect to the following detailed description, appended claims, and accompanying drawings. Of course, the actual scope of the invention is defined by the appended claims and their equivalents.

BRIEF DESCRIPTION OF THE DRAWINGS

The patent or application file contains at least one drawing executed in color. Copies of the patent or patent application publication with color drawing(s) will be provided by the Office upon request and payment of the necessary fee.

DETAILED DESCRIPTION

Aspects of embodiments of the present invention are directed to a system and method for managing multiple interactions via a mobile application on a mobile device. According to one embodiment, an enterprise provides an application for downloading to an agent's mobile device. The application may be invoked for accessing and managing interactions received by the agent and initiated by the agent. For example, if the enterprise is a contact center, the interactions may include communications with customers of the contact center (e.g., requests for support) and communications with supervisors or other agents of the contact center (e.g., consultations). The actual logic of the application might be incorporated into the application, or the application may invoke the mobile device's web browser to access the logic over the web.

Figure 1A:
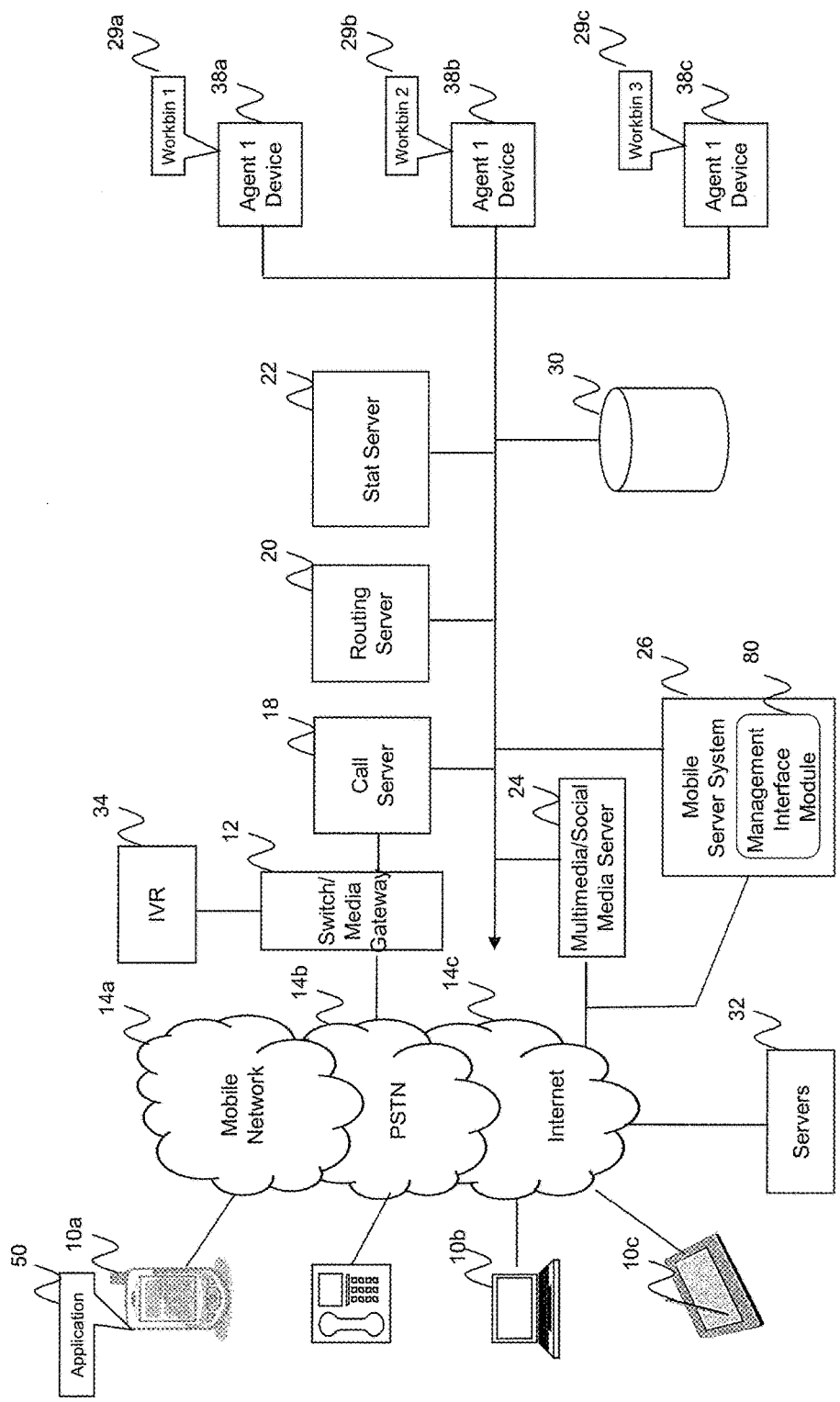
FIG. 1A is a semi-schematic block diagram of a system supporting a contact center that is configured to provide mobile device support to contact center customers according to one embodiment of the invention.

FIG. 1A is a semi-schematic block diagram of a system supporting a contact center that is configured to provide mobile device support to contact center customers according to one embodiment of the invention. The contact center infrastructure may be premise based or hosted.

According to one exemplary embodiment, the contact center includes resources (e.g. personnel, computers, and telecommunication equipment) to enable delivery of services via telephone or other communication mechanisms, such as, for example, text, chat, email, or the like. Such services may vary depending on the type of contact center, and may range from customer service to help desk, emergency response, telemarketing, order taking, and the like. According to one embodiment, the contact center is an IT help desk configured to receive service requests, route service requests to appropriate parties, such as, for example, engineers, IT personnel, or the like (also collectively referred to as agents or knowledge workers), and provide updates to the customers submitting the service requests.

Customers, potential customers, or other end users (collectively referred to as customers) desiring to receive services from the contact center may initiate inbound calls to the contact center via their end user devices. The end user devices 10a-10c (collectively referenced as 10) include, for example, mobile communication devices such as, for example, cellular phones (including smartphones), laptops, electronic tablets, and the like. The end user devices may also include standard land-line telephones, desktops, or other consumer electronic devices (e.g. televisions, set-top boxes, gaming consoles, and the like) configured for voice, data, and/or multimedia communication as is conventional in the art. Users operating the end user devices 10 may initiate, manage, and respond to telephone calls, emails, chats, text messaging, web-browsing sessions, and other multi-media transactions, via one or more customer applications 50 downloaded and/or executed by the end user devices.

Inbound and outbound calls from and to the end users devices 10 may traverse a telephone, cellular, and/or data communication network 14 depending on the type of device that is being used. For example, the communications network 14 may include a private or public switched telephone network (PSTN) 14b, mobile network 14a, and a private and/or public wide area network. In the embodiment of FIG. 1A, the Internet 14c is depicted as an example of the public wide area network.

The mobile network 14a may include, for example, a code division multiple access (CDMA) network, global system for mobile communications (GSM) network, and/or any 3G or 4G wireless carrier network conventional in the art. The mobile network may also be a WiFi or other similar wireless network. In addition, the mobile network may support dedicated solutions for providing wireless access to the Internet, such as, for example, Gogo, Tetra, and the like.

The Internet network 14b may include various servers 32 including, for example, social networking servers, voice over IP (VoIP) servers, web servers, application servers, or other computing resources (e.g. database servers for accessing data stored in databases) which users may leverage for interacting with the contact center. The servers 32 may also provide web pages for the enterprise supported by the contact center. End users may browse the web pages and get information about the enterprise's products and services. The web pages, in conjunction with browser capabilities such as HTML5 and service specific servlets may also provide different mechanisms for contacting the contact center (e.g. web chat, voice call, email, web real time communication (WebRTC), or the like).

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

According to one exemplary embodiment of the invention, the switch is coupled to an interactive voice response (IVR) server 34. The IVR server 34 is configured, for example, with an IVR script for querying customers on their needs. For example, a contact center for IT help may tell callers, via the IVR script, to "press 1" if they wish to get the status of a service request, whereas a contact center for a bank may tell callers to press the same number to get an account balance. Through continued interaction with the IVR, customers may even complete service without needing to speak with an agent.

If the call is to be routed to an agent, a request is made to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

Once an appropriate agent is available to handle a call, a connection is made between the caller and the agent device 38*a*-38*c* (collectively referenced as 38) of the identified agent. Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20. The routing strategy may consider, for example, information about agent availability, skills, and other routing parameters provided, for example, by a statistics server 22.

The contact center may also include a multimedia/social media server 24 for engaging in media interactions other than voice interactions with the end user devices 10 and/or servers 32. The media interactions may be related, for example, to email, vmail (voice mail through email), chat, video, text-messaging, web, social media, screen-sharing, and the like. According to one embodiment, each agent device includes an agent desktop application (referred to as an interaction workspace) which an agent may invoke to engage in the media interactions. The agent desktop application may also be invoked to display customer data and information on past interactions with the customer.

According to one exemplary embodiment, the contact center system further includes a mobile server system 26 for interacting with customer applications 50 installed in the mobile devices. According to an embodiment, the mobile server system 26 includes a management interface module 80 for interfacing with different components of the enterprise system. For example, the management interface module 80 may be invoked to communicate with a configuration server for retrieving configuration parameters associated with the application. The management interface module 80 may also provide interface screens and graphical presentations of elements to users of the applications in accordance with the configuration parameters. The management interface module 80 may be distributed over one or more application servers each having a processor and a memory, the memory storing computer program instructions for accomplishing the functionality of the modules. Also, although the module is assumed to be a separate functional unit, those skilled in the art will recognize that the functionality of the module may be combined or integrated into a single module, or subdivided into sub-modules without departing from the spirit of the invention.

The mobile server system may also be configured to process interactions from a web browser invoked by the customer's mobile device. According to one embodiment, the mobile server system 26 is configured to interact with the customer application 50 and contact center resources via the REST (representational state transfer) protocol as is conventional in the art. According to one embodiment, a particular customer application 50 interacting with the mobile server system 26 may be a technical support application that allows the user to view or update service requests while the user is on the move, even when the user has no access to a computer.

According to one exemplary embodiment of the invention, the routing server 20 is enhanced with functionality for managing back-office/offline activities that are assigned to the agents. Such activities may include, for example, responding to emails, responding to letters, handling service requests, attending training seminars, or any other activity that does not entail real time communication with a customer. Once assigned to an agent, an activity may be pushed to the agent in real time, or may appear in the agent's workbin 26*a*-26*c* (collectively referenced as 26) as a task to be completed by the agent. The agent's workbin may be implemented via any data structure conventional in the art, such as, for example, a linked list, array, and/or the like. The workbin for one or more agents may be maintained and managed centrally from an application server.

According to one exemplary embodiment of the invention, the contact center also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. The one or more mass storage devices may also store information on tasks handled by knowledge workers such as, for example, tasks relating to service requests provided by the customers. The information may include, for example, status information, disposition information, information on the party assigned to handle the task, business value, priority, and the like. According to one embodiment, some of the data (e.g. customer profile data) may be provided by a third party database such as, for example, a third party customer relations management (CRM) database via a third party server. The mass storage device may take form of a hard disk or disk array as is conventional in the art.

The various servers of FIG. 1A may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

As used herein, the term "icon" may refer to a software object and the underlying programmed logic of the software object (e.g., the underlying model and controller of a model-view-controller (MVC) software architectural pattern), and may also refer to the graphical presentation of the software object. The management interface module 80 may activate the control logic of the software object via graphical or non-graphical operations. For example, the control logic may be activated via graphical interaction with the graphical presentation of the software object. The control logic of the software object may also be activated via a non-graphical operation such as sending of an instruction via a command-line interface.

According to one embodiment, the application allows a user to manage multiple interactions within a single mobile device screen. For example, instead of providing static tabs to alternate between different screens, the application may, according to one embodiment, provide dynamic icons to represent the interactions, which are overlaid on the current screen. According to one embodiment, an icon representing an interaction is embedded with intelligent controls that allow a user to access and control the interaction without leaving the current screen.

According to one embodiment, attributes of the icon correspond to attributes of the interaction represented by the icon. For example, attributes of the graphical presentation of the icon such as the color, size, shape, orientation, position, and/or movement of the icon may correspond to an interaction type, KPI, or priority level of the represented interaction. According to an embodiment, the management interface module 80 is configured to dynamically change the icon according to the status of the represented interaction. For example, the graphical presentation of the icon may have dynamic movement features such as blinking or rotating. In one embodiment, the management interface module 80 may move the icon downward from the top of the screen to the bottom of the screen in accordance with a desired handling time for the represented interaction.

According to an embodiment, non-graphical attributes of the icon, such as data and underlying programmed logic of the software object, correspond to attributes of the represented interaction. For example, the underlying logic may include embedded controls that are specific to the type of interaction that is represented by the icon. In one example, a voice call interaction may be represented by an icon that has embedded controls for pausing and resuming the interaction. The underlying logic may also be configured to retrieve an interaction object associated with the interaction. The interaction object may maintain information about the represented interaction, including a session ID representing that interaction, calling number, called number, IVR selections, any data exchanged during the interaction, and interaction history.

Figure 1B:
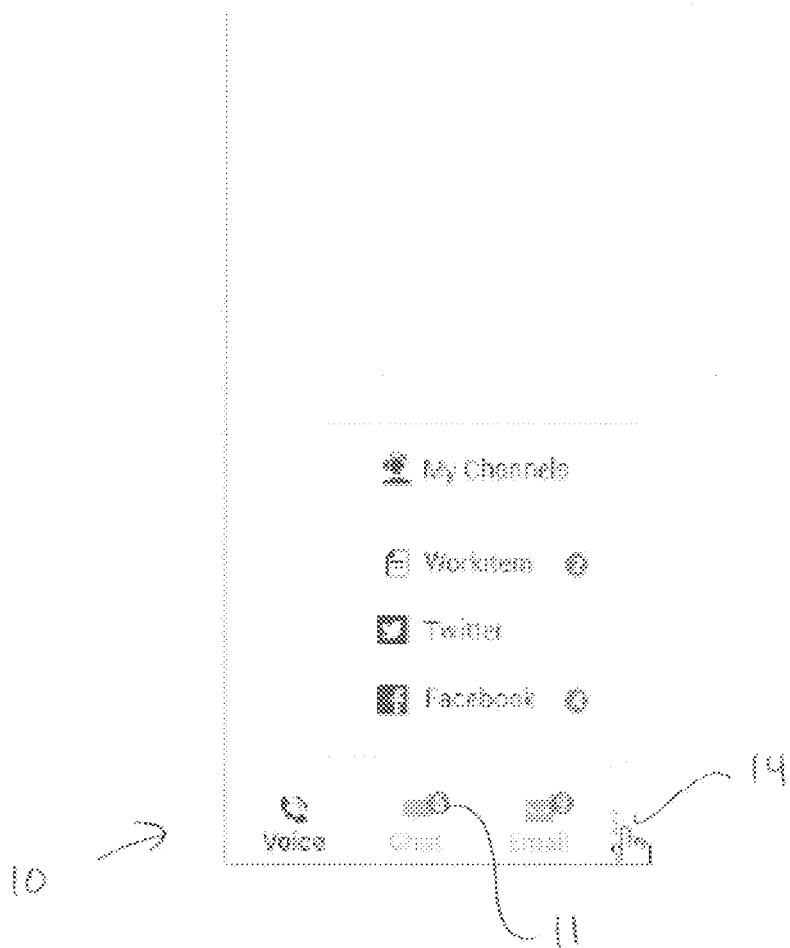
FIG. 1B is a screen shot of a menu of a mobile application according to an embodiment of the invention.

FIG. 1B is a screen shot of a menu of a mobile application according to an embodiment of the invention. According to one embodiment, a global channel bar 10 allows a user to access multiple channels (e.g., three channels) at a time. In one example embodiment, the available channels include Voice, Chat, Email, Facebook® (Facebook® is a registered trademark of Facebook, Inc.), Twitter® (Twitter® is a registered trademark of Twitter, Inc.), and Workitem. By clicking on the channel icons in the global channel bar 10, a user can quickly switch (or toggle) between different channels. Each channel icon has an update icon 11 for depicting a number of interactions that are pending a response. For example, the update icons in FIG. 1B indicate that there are 9 unread emails in the email channel, 5 chat sessions waiting for acceptance, 2 work items waiting for acceptance, and 4 unread messages received on Facebook®. Additional channels may be displayed in a pop-up window by selecting the pop-up menu icon 14. The pop-up menu icon 14 may itself change color to indicate the presence of interactions pending a response on the additional channels within the pop-up menu.

Figure 2A:
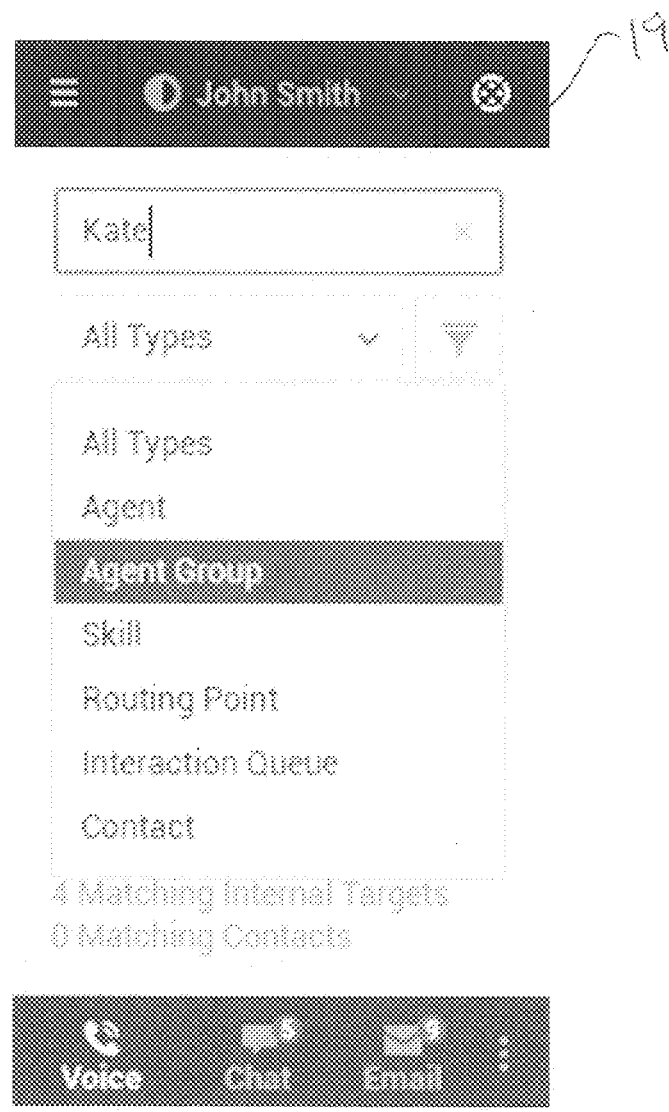
FIGS. 2A-2D are screen shots of a team communicator of a mobile application according to an embodiment of the invention.

FIGS. 2A-2D are screen shots of a team communicator of a mobile application according to an embodiment of the invention. According to an embodiment, the management interface module 80 provides a globally accessible team communicator button 19 that allows a user to search a database for a recipient of an interaction. As shown in FIG. 2A, the management interface module 80 provides several search categories, including "All Types," "Agent," "Agent Group," "Skill," "Routing Point," "Interaction Queue," and "Contact."

In one embodiment, the "Agent" category lists all of the agents within an enterprise (e.g., a contact center) to which an interaction could be routed or transferred. The "Agent Groups" category includes logical groupings of agents, and interactions may be pushed to agents within groups via routing based on, for example, availability or on a round-robin basis. In one embodiment, the routing server 20 is configured to deposit tasks (e.g., interactions such as emails, calls, etc.) into agent group work bins where group members can pick them up. The agent groups may include virtual agent groups that are dynamic. For example, in one embodiment groups may be defined through skill expression. An enterprise may utilize agent groups to generate reports for measuring enterprise performance.

In one embodiment, the "Skill" category is a logical entity that represents the type of service agents are trained to provide. According to an embodiment, the "Skill" category could also be applied in a broader sense, such as currently assigned activity (e.g., "mortgage"). Skills may be re-assigned dynamically. For example, the language skill "Spanish" could be temporarily removed to exclude the given agent from such interactions. Skills may also have proficiency levels, e.g., 1 to 10 (with 10 indicating a high proficiency), that are used in skills-based routing logic. In one example, the routing server 20 is configured to route tasks to an agent with the skill "Spanish" and a proficiency level greater than 5.

According to an embodiment, the "Routing Point" category may refer to telephony objects within a telephony switch at which calls reside while routing decisions are being made. The "Routing Point" category may also include virtual routing points applied to non-voice interactions. According to an embodiment, a virtual routing point is a virtual telephony object whose event model corresponds to the event model of a regular routing point. In an embodiment, an interaction is moved to a routing point for waiting to be routed. A routing strategy is associated with the routing point, and the routing strategy is executed as soon as a new interaction arrives at the routing point. In one example embodiment, a routing strategy first sends a call to an IVR where user responses are collected, and once returned back to the routing point an appropriate agent is selected as a first-choice routing target. If no first-choice routing target becomes available within a defined time limit, the second-best target is selected, and so on. In one example, a routing point may be a telephone extension, and that extension could in turn point to an individual agent or skill.

According to an embodiment, the "Interaction Queue" category is a virtual entity for grouping agents based on their location or any other business logic. The "Interaction Queue" category may include also virtual queues. According to an embodiment, an interaction queue (or queue object) is a queue in a business process executed by an interaction server. Interaction queues may be created by business process developers of the enterprise. Once configured, interactions (e.g., emails, chats) are selected and extracted, and submitted to strategy objects that send them to another interaction queue or a target (e.g., an agent, workbin, or server). The definition of an interaction queue may be stored as a script object in a configuration database. Interactions submitted to a routing server may be placed in virtual queues, which are logical queues to which interactions are queued if specified targets in the routing objects within a routing strategy are not available. According to an embodiment, just as a business process keeps its interactions in interaction queues, the routing server 20 keeps its interactions in virtual queues (and its connections list can have many different T-servers). The routing server 20 communicates with an interaction server about email, chat, and open media types of interactions, and with a voice T-Server about voice calls. Interactions sent to the routing server 20 from the interaction server may be returned to the interaction server if the target is unavailable. Further, according to an embodiment, in addition to interaction and virtual queues, there are also ACDQueue routing target objects.

The "Contact" category may include predefined external numbers which have been added to quickly access those transfer points without the need to manually dial those numbers. The "All Types" category refers to all of the above categories.

Figure 2B:
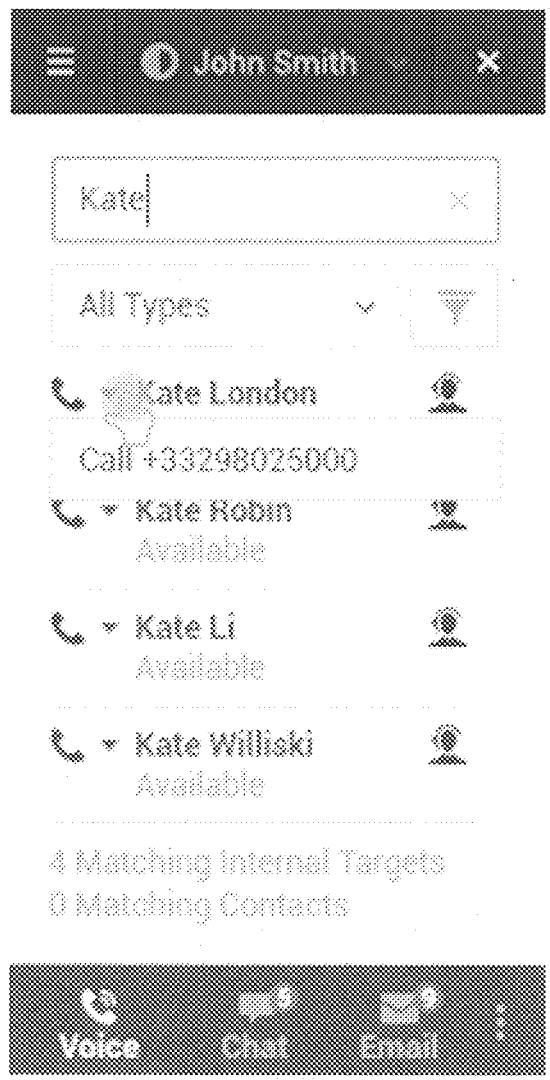
Figure 2C:
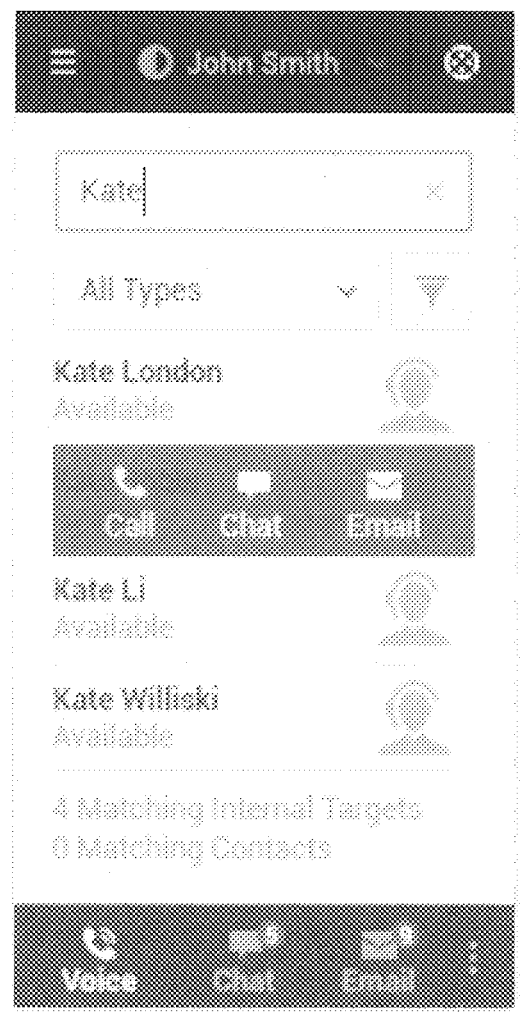
Figure 2D:
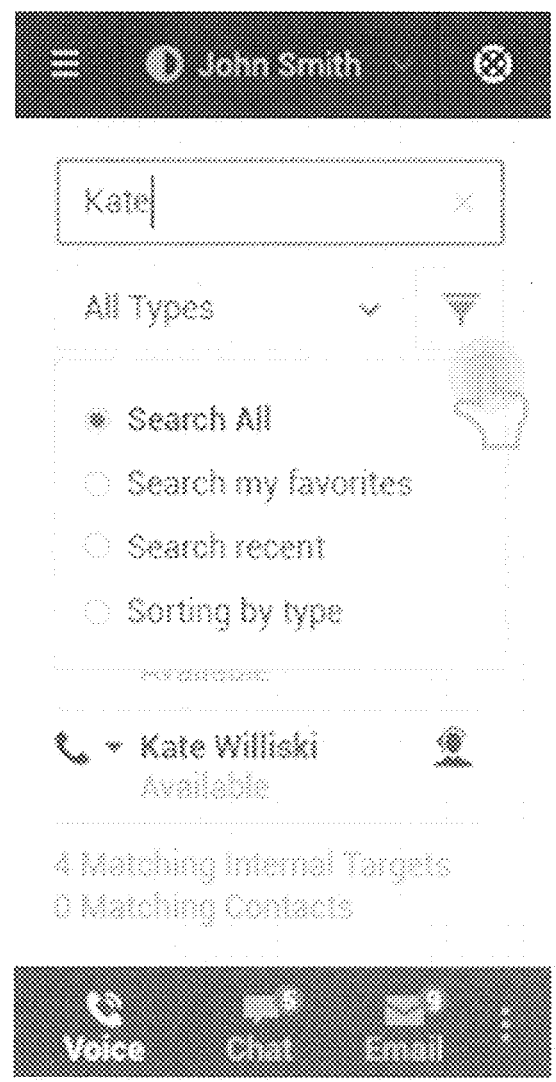

In FIG. 2B, the management interface module 80 displays search results with a call to action link for contacting each search result. As shown in FIG. 2C, the management interface module 80 may also provide a menu of different options for contacting a search result through a variety of different channels. In FIG. 2D, an expanded filter stat provides additional options for filtering a search, such as searching a user's favorites, searching recent categories, and sorting by type, in which search results can be sorted in a particular order such as by skill or agent group or queue.

Figure 3A:
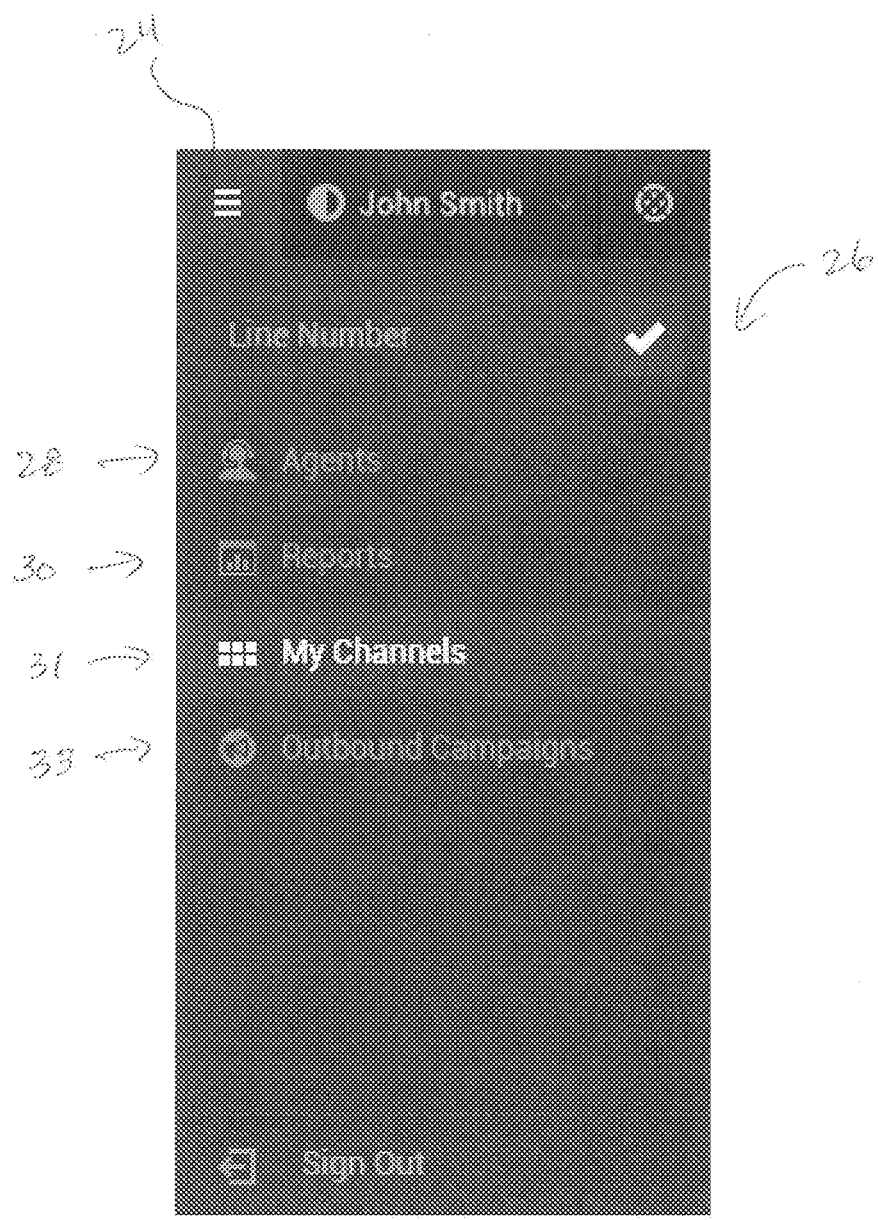
FIGS. 3A-3C are screen shots of a channels menu of a mobile application according to an embodiment of the invention.
Figure 3B:
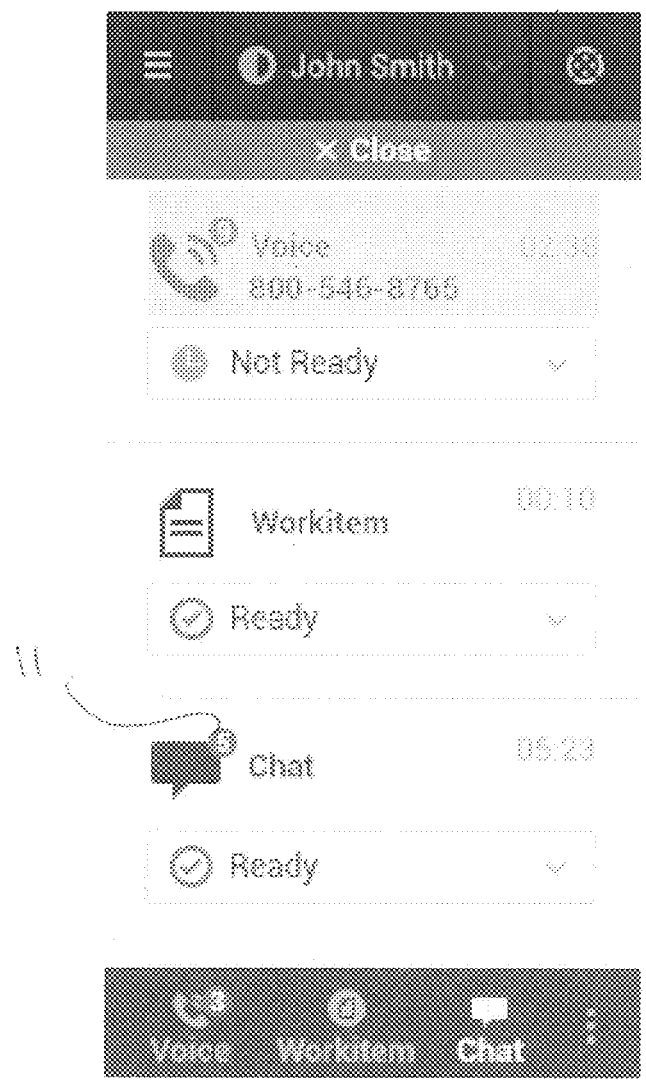
Figure 3C:
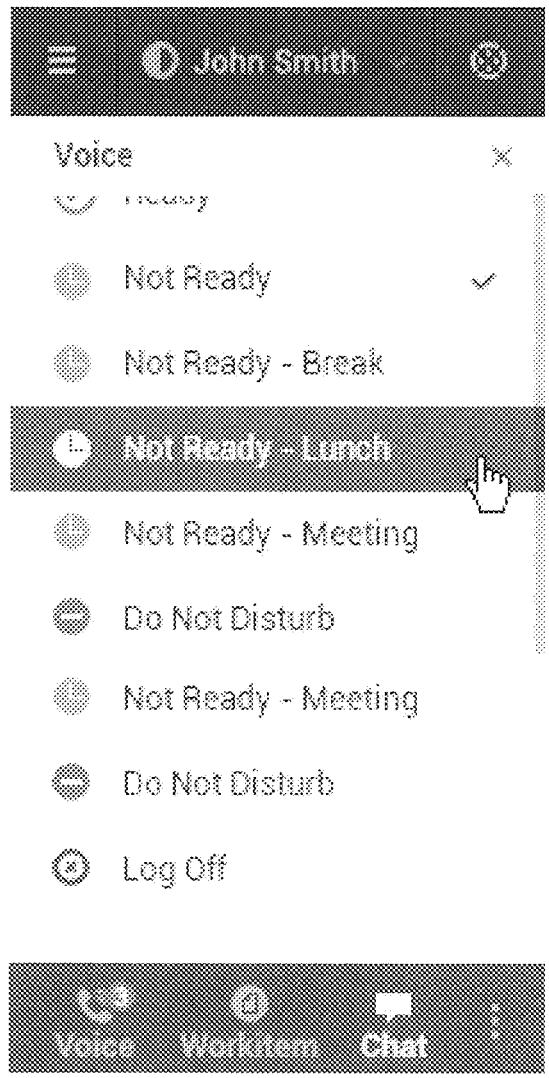

FIGS. 3A-3C are screen shots of a channels menu of a mobile application according to an embodiment of the invention. In one embodiment, the management interface module 80 provides a globally accessible main menu icon 24 to provide the user with a menu of options. According to an embodiment, the main menu includes a line number field 26 for entering a user's phone number based on a user's scenario, such as a home number if the user is working from home. The main menu may also include an Agents icon 28, a Reports icon 30, a My Channels icon 31, and an Outbound Campaigns icon 33. The bottom of the main menu may include a Sign Out button to log out of the mobile application.

In one embodiment, upon selection of the My Channels icon 31, the management interface module 80 presents the My Channels home screen shown in FIG. 3B. In one embodiment, each channel has an update icon 11 (which appears only when an interaction pending a response is present), a time, and a status indicator of the user. In FIG. 3B the voice channel also includes a phone number of the user. When a status button is selected for a channel, as shown in FIG. 3C the management interface module 80 provides a listing of detailed status options. The status listing may be a drop-down menu or may be implemented as an animated pop-up window (e.g., a window that pops up from the bottom of a screen)

Voice Channel

Figure 4:
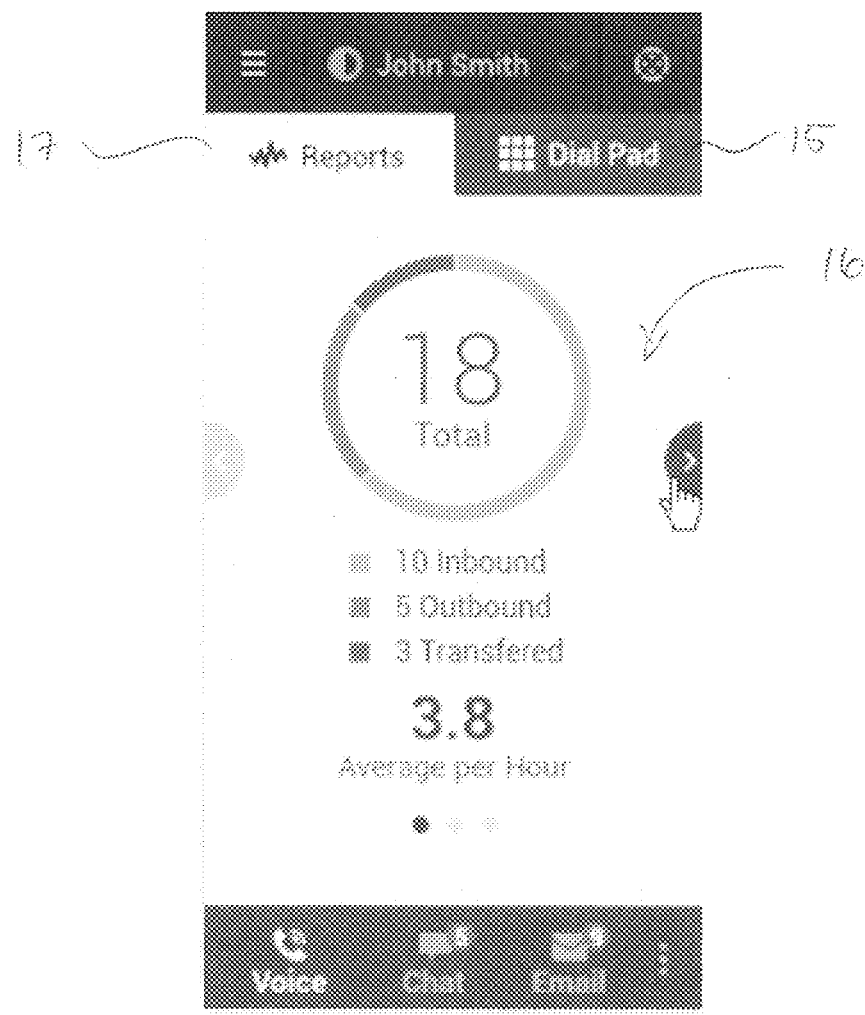
FIG. 4 is a screen shot of a voice channel of a mobile application according to an embodiment of the invention.
Figure 5:
FIG. 5 is a screen shot of a dial pad screen of a mobile application according to an embodiment of the invention.

FIG. 4 is a screen shot of a voice channel of a mobile application according to an embodiment of the invention. The voice channel home screen may be a default screen of the management interface module 80 after login. According to an embodiment, the reports tab 17 of the voice channel home screen displays user-specific information pertaining to voice calls, such as the total number and individual numbers of inbound, outbound, and transferred calls handled by the user, and the user's average rate of handling calls. The voice channel home screen shown in FIG. 4 also includes a graphical presentation 16 of the inbound, outbound, and transferred calls handled by the user. In the graphical presentation 16, each type of call (e.g., inbound, outbound, transferred) is represented by a segment of the ring of the graphical presentation 16. In one embodiment, different segments are displayed in different colors. According to an embodiment, the voice channel home screen further includes a dial pad tab 15 to switch to the dial pad screen shown in FIG. 5.

Figure 6A:
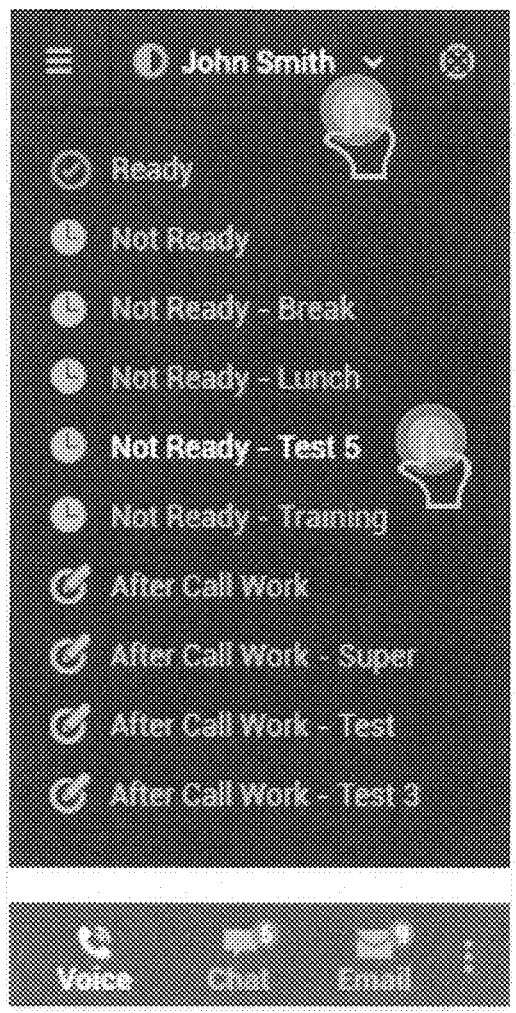
FIGS. 6A and 6B are screen shots of status menus of a mobile application according to an embodiment of the invention.
Figure 6B:
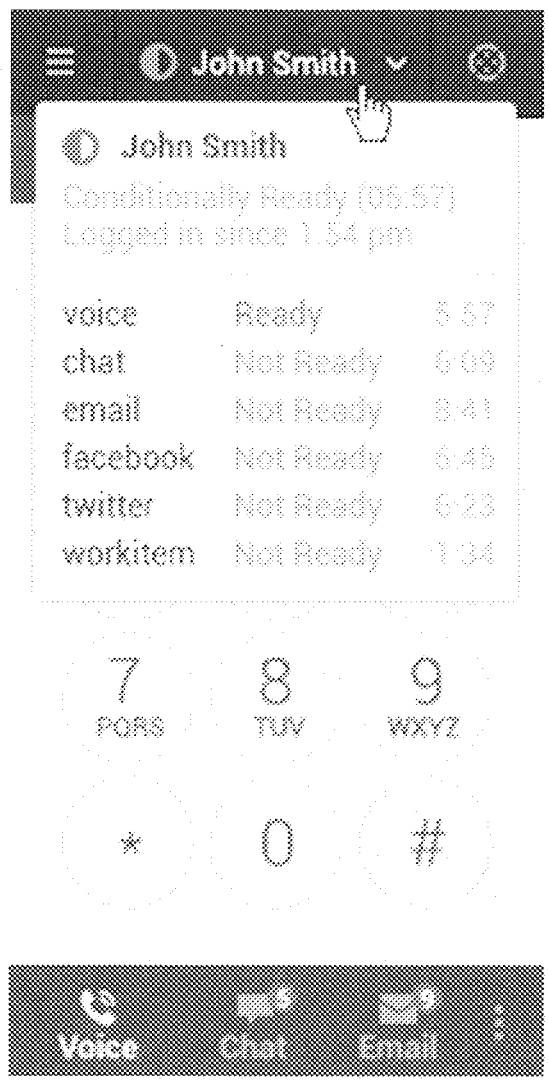

FIGS. 6A and 6B are screen shots of status menus of a mobile application according to an embodiment of the invention. According to an embodiment, the system is configured to change a user's status automatically. For example, an agent of a contact center may automatically be shown as not available on the voice channel while answering a call. In one embodiment, the management interface module 80 provides a user with an option to manually set a state change. As shown in FIG. 6A, in one example embodiment the management interface module 80 provides a drop-down menu of detailed status indicators such as "Not Ready— Break." Additionally, as illustrated in FIG. 6B, the management interface module 80 allows a user to set a specific status with respect to each channel. The management interface module 80 provides a list of statuses for all channels in response to a pointer device (e.g., a mouse) hovering over the user's name at the top of the screen.

Figure 7A:
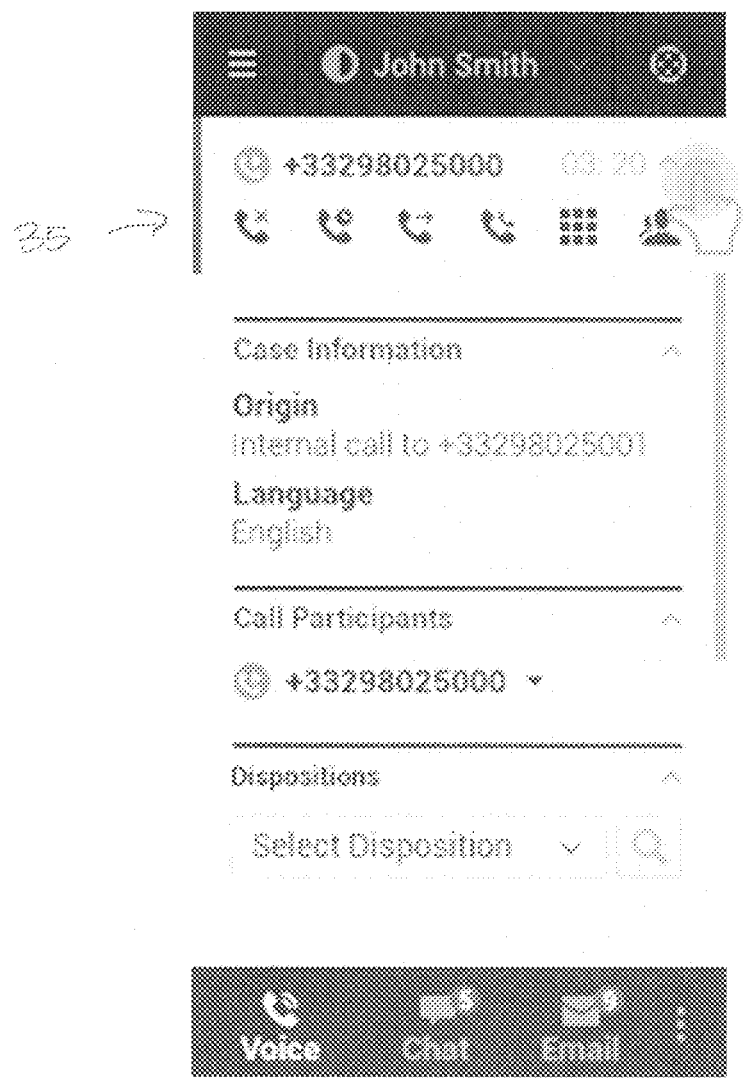
FIGS. 7A-7B are screen shots of an active voice interaction of a mobile application according to an embodiment of the invention.
Figure 7B:
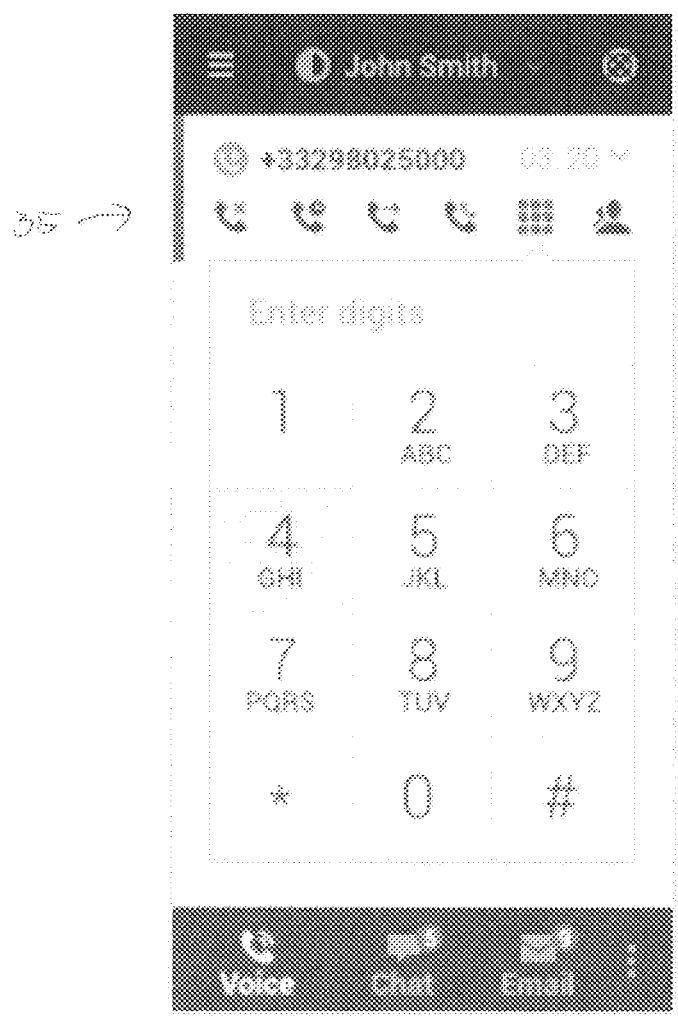

FIGS. 7A-7B are screen shots of an active voice interaction of a mobile application according to an embodiment of the invention. In FIG. 7A, the management interface module 80 has established an active voice interaction (e.g., a telephony call). During the call, the management interface module 80 provides an expanded menu 35 of options. In one embodiment, the options are (from left to right): End Call, Hold Call, Instant Call Transfer, Instant Call Conference, Keypad, and Consult. The active call screen also provides data about the voice interaction, including Case Information such as the origin of the interaction and language for the interaction, a list of Call Participants, and a menu of Dispositions. According to an embodiment, dispositions include codes that indicate an outcome of an interaction. The outcome may be technical (e.g., callback requested) and/or business (e.g., purchase amount above $100) related. Disposition codes may be similar to tags assigned to an interaction, which enable filtering of those interactions based on the tags. The disposition codes or tags can be created and customized based on the enterprise's business needs. When the Keypad icon in the menu 35 is selected, the management interface module 80 provides a dial pad such as that shown in FIG. 7B for allowing the user to dial in another participant to the call.

Figure 8A:
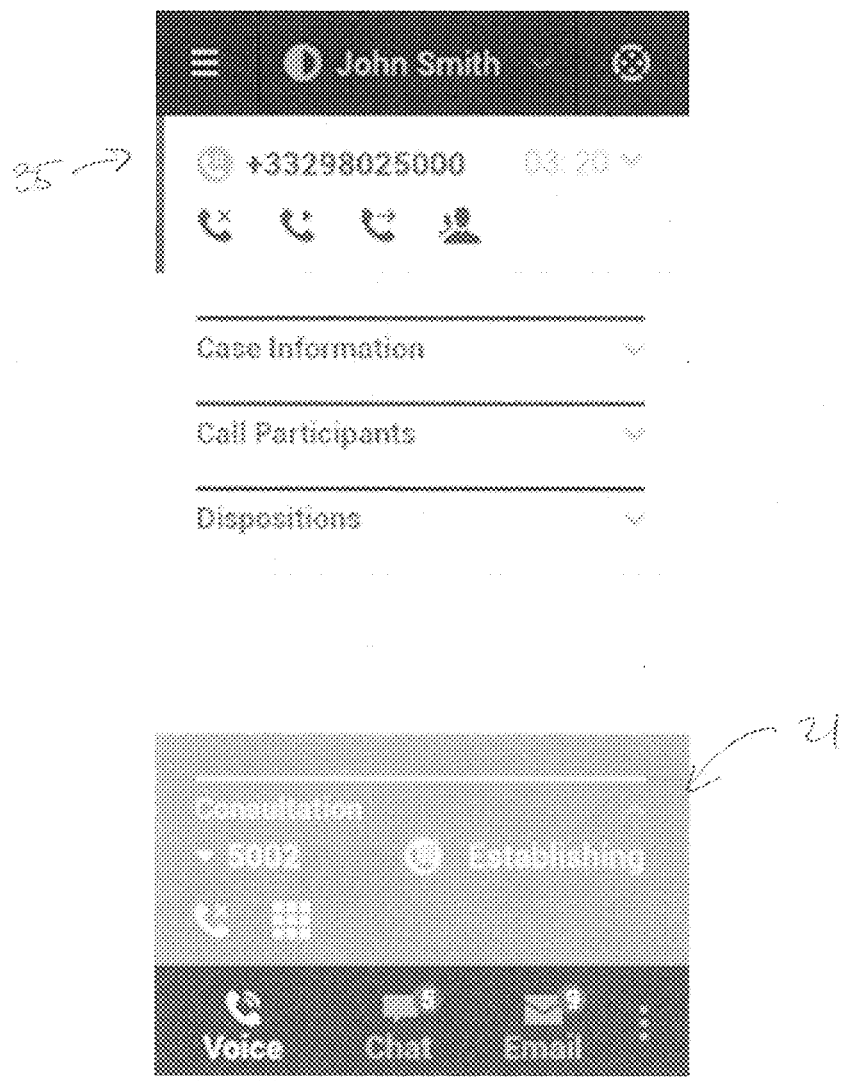
FIGS. 8A-8C are screen shots of a consultation in a voice channel of a mobile application according to an embodiment of the invention.
Figure 8B:
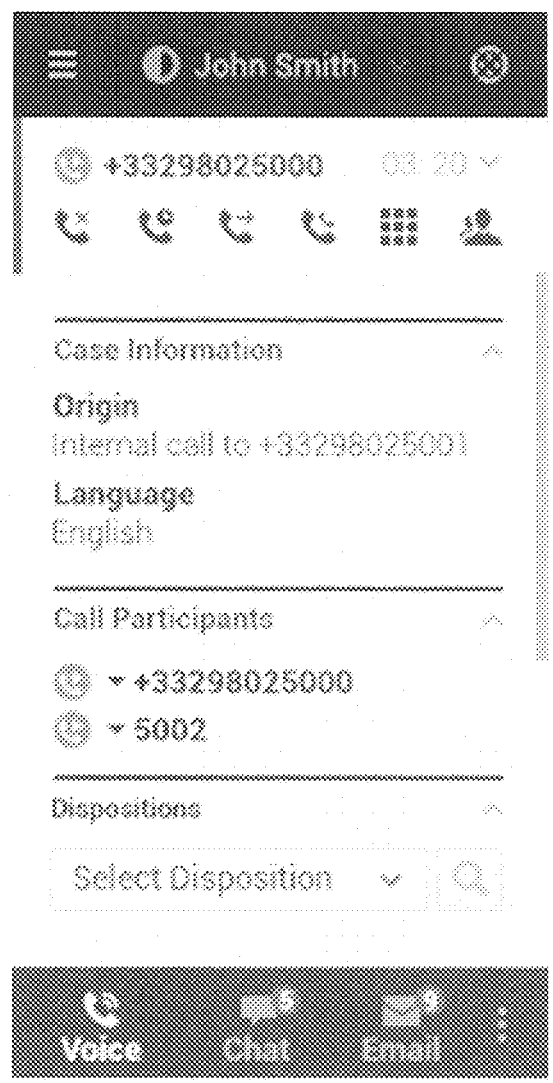
Figure 8C:
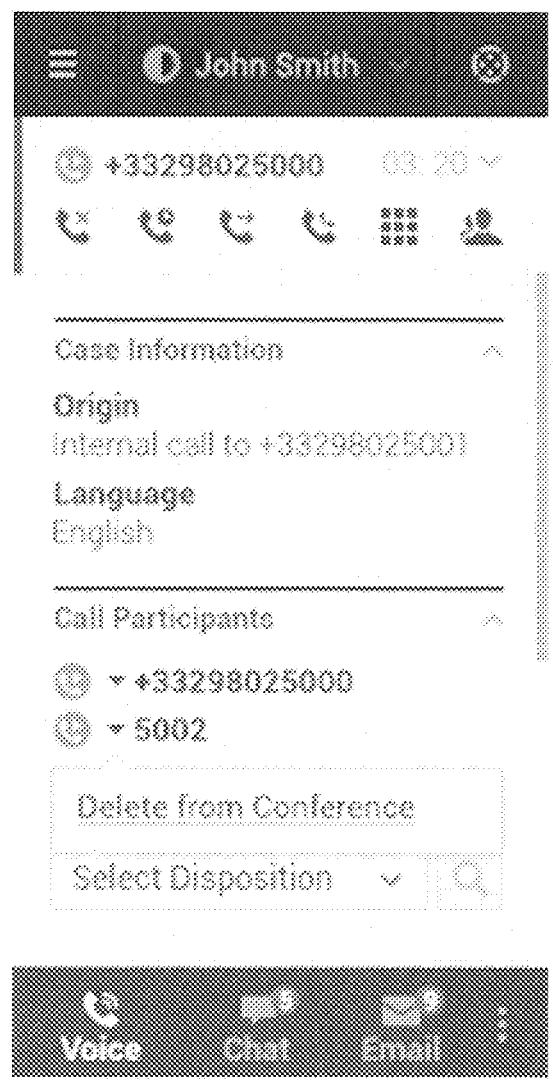

FIGS. 8A-8C are screen shots of a consultation in a voice channel of a mobile application according to an embodiment of the invention. In one embodiment, the management interface module 80 automatically places a current voice interaction (e.g., a telephony call with a customer) on hold when a user selects the consult option in the menu 35. As shown in FIG. 8A, in one embodiment the management interface module 80 automatically collapses the menus for Case Information, Call Participants, and Dispositions to provide space for the consultation window 21 at the bottom of the screen. The consultation window 21 includes options for disconnecting the consultation and for accessing a dial pad to dial in another agent into the consultation. According to one embodiment, the consulting agent may be added to a conference call with the original participant of the voice interaction (e.g., the customer on the telephony call). As shown in FIG. 8B, once the conference call is in progress, the Call Participants menu includes identifiers (e.g., phone numbers) of both the original participant of the voice interaction and the consulting party. Additionally, in one embodiment, as shown in FIG. 8C, the management interface module 80 provides the user with the option to delete a participant from the conference call by selecting a delete command from a drop-down menu while the call is ongoing.

Figure 9A:
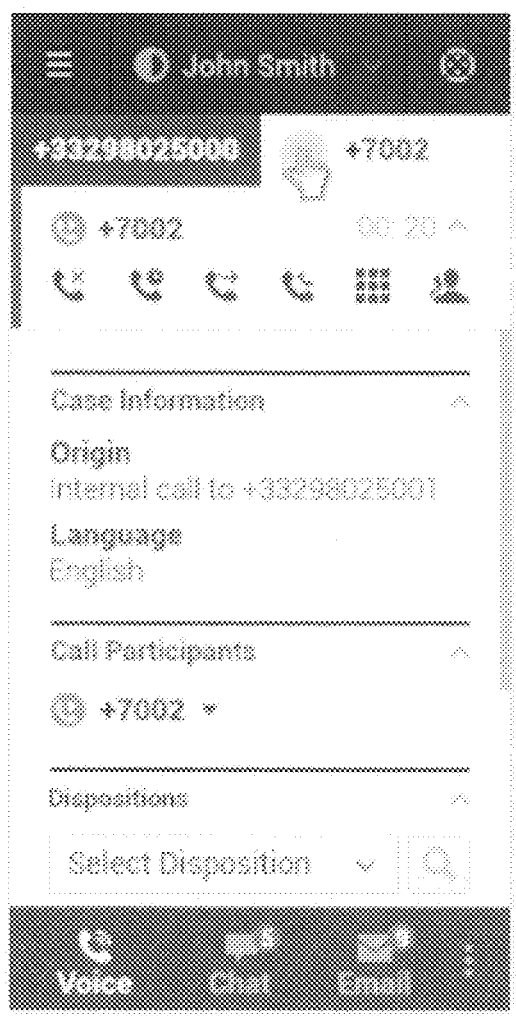
FIGS. 9A-9C are screen shots of a concurrent voice interactions scenario of a mobile application according to an embodiment of the invention.
Figure 9B:
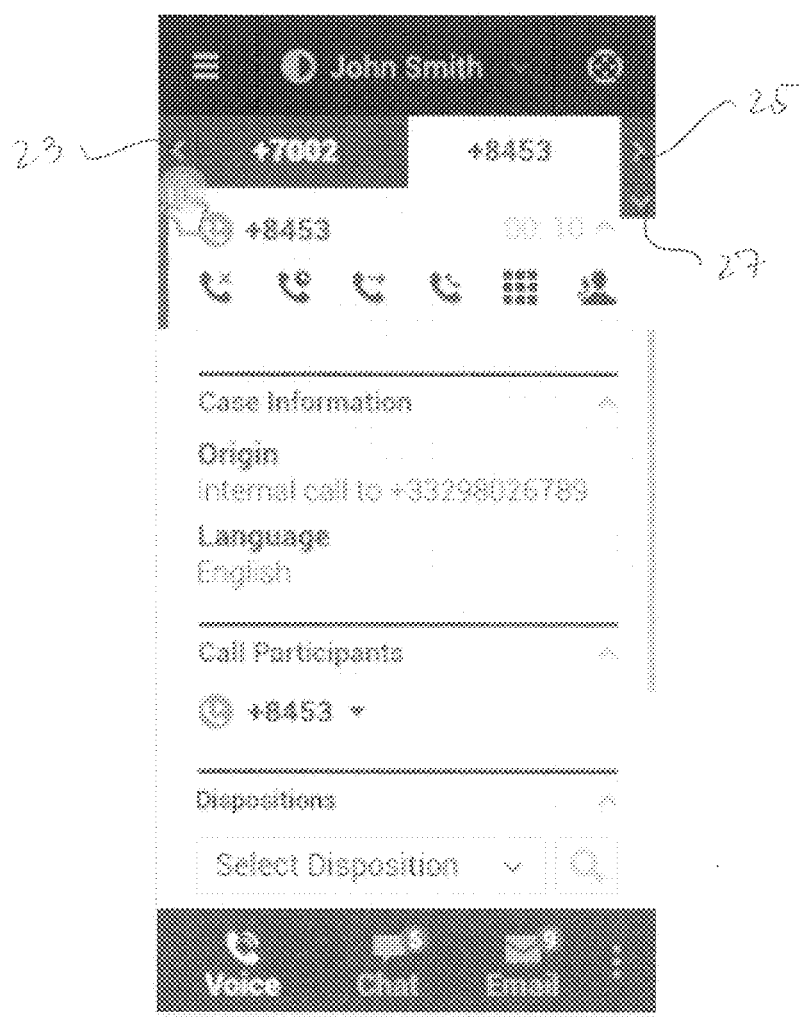
Figure 9C:
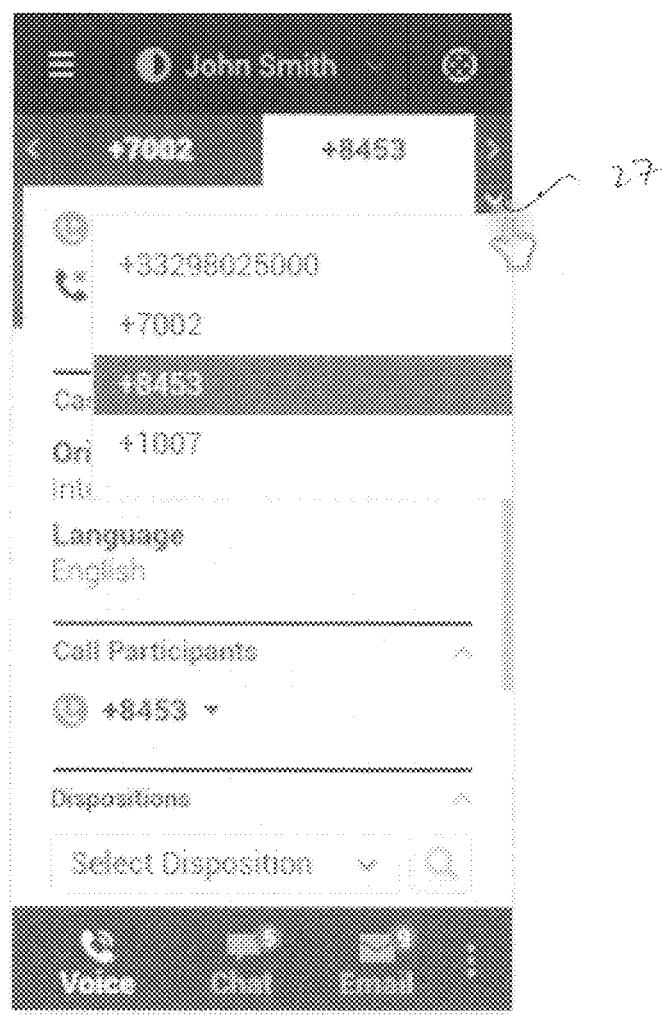

FIGS. 9A-9C are screen shots of a concurrent voice interactions scenario of a mobile application according to an embodiment of the invention. In the scenario depicted in FIG. 9A, the management interface module 80 displays a tab for each received and accepted voice interaction. Each tab provides access to a screen containing information about the interaction, including Case Information, Call Participants, and Dispositions. According to an embodiment, the management interface module 80 switches between call legs (or call segments) in response to a user selecting a respective one of the tabs. In one embodiment, the management interface module 80 provides a left chevron 23 and a right chevron 25 as shown in FIG. 9B to scroll between tabs for additional voice interactions. In one embodiment, as shown in FIG. 9C the management interface module 80 further provides a down chevron 27 that displays a list of all active voice interactions.

Chat Channel

Figure 10A:
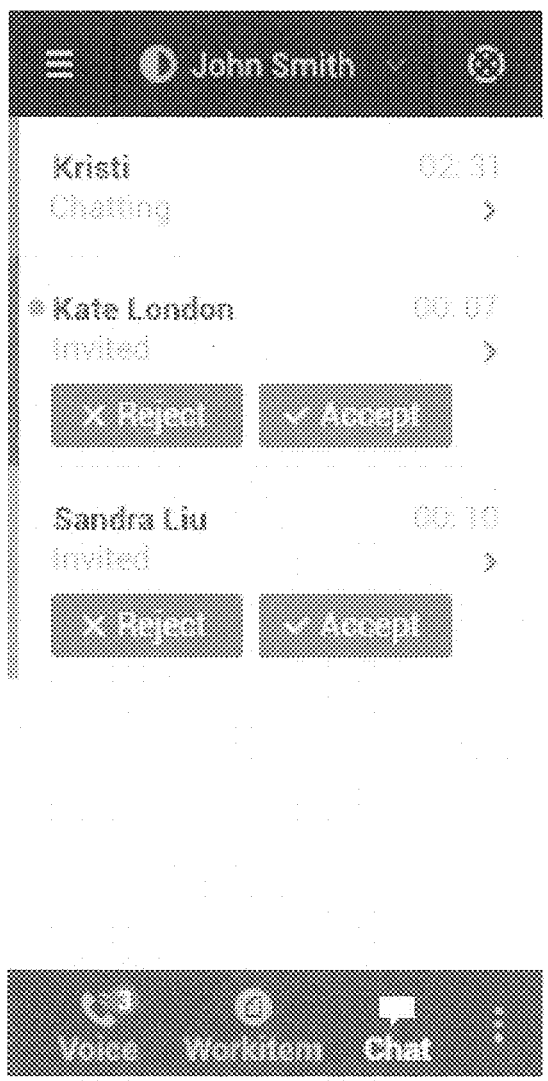
FIGS. 10A-10D are screen shots of a chat channel of a mobile application according to an embodiment of the invention.
Figure 10B:
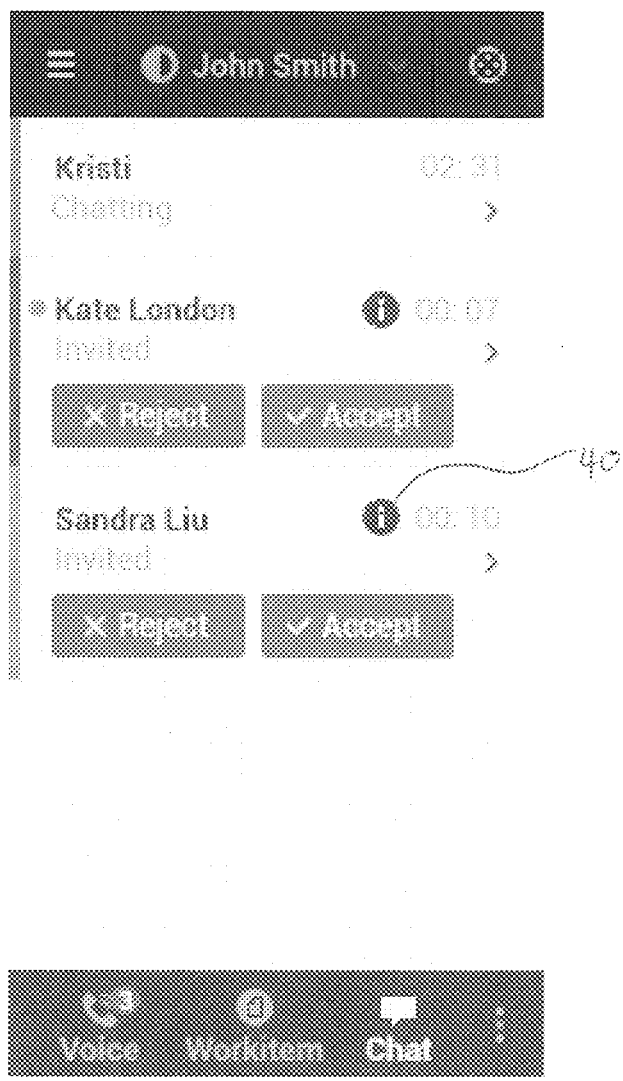
Figure 10C:
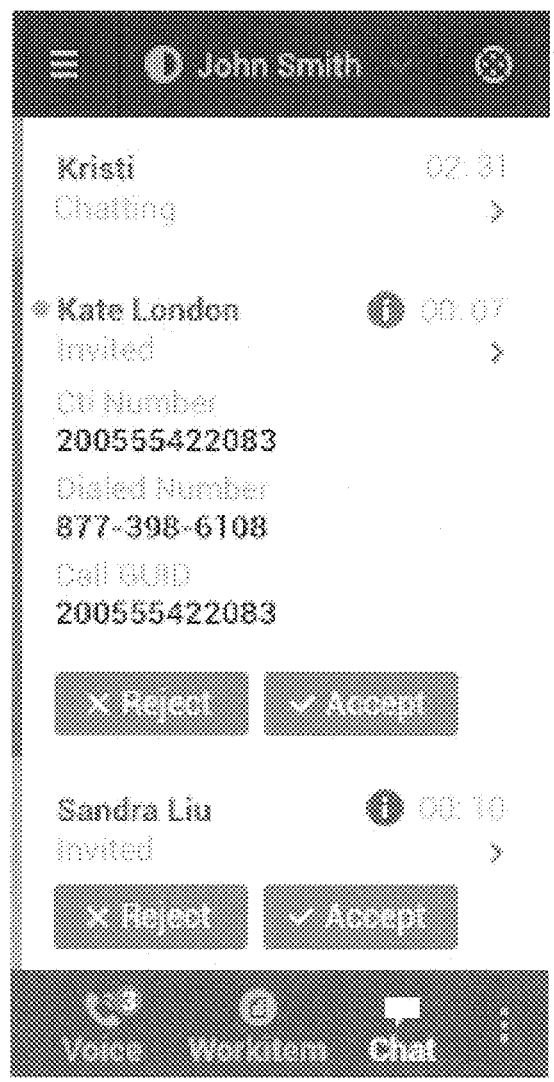
Figure 10D:
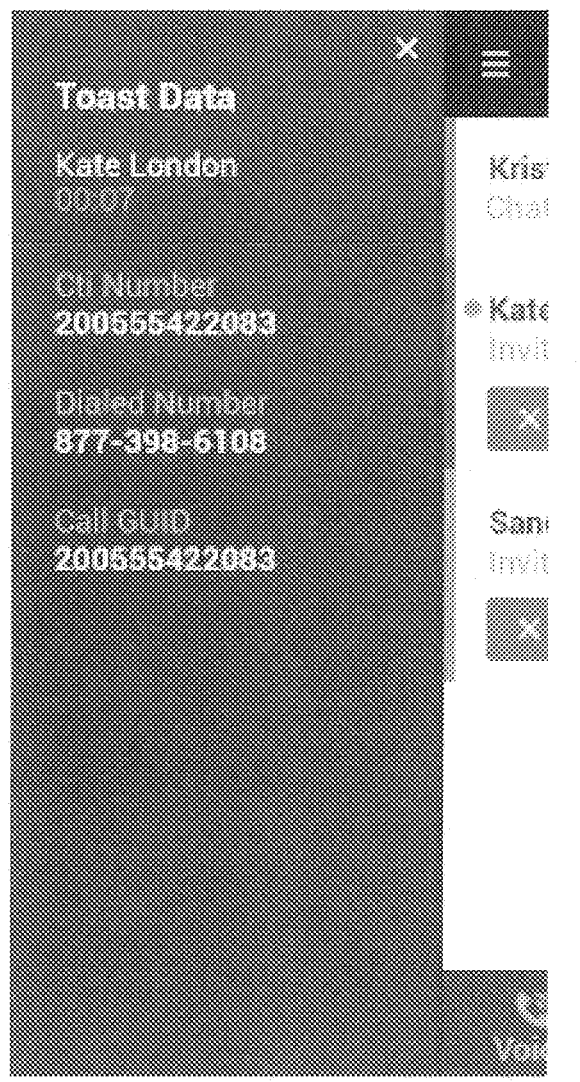

FIGS. 10A-10D are screen shots of a chat channel of a mobile application according to an embodiment of the invention. In the example embodiment of FIG. 10A, a user has one chat in progress and two chats pending acceptance or rejection. The management interface module 80 provides a green dot next to a requestor's name to indicate a new chat request. As depicted in FIG. 10B, the management interface module 80 may further provide an information icon 40 that, when selected, triggers an expanded window within the screen as shown in FIG. 10C. In the example of FIG. 10C, an expanded view displays "toast data" about the selected agent "Kate London," which the user may view before deciding whether to accept or reject the interaction. In one embodiment, the management interface module 80 is further configured to respond to selection of an information icon for another agent (e.g., for "Sandra Liu") by collapsing the expanded window for "Kate London" and expanding the corresponding window for "toast data" about "Sandra Liu." According to the example embodiment shown in FIG. 10D, the management interface module 80 displays the "toast data" via an animated menu that slides into view on the screen (e.g., from the left to the right).

According to one embodiment, the management interface module 80 assigns chat interactions to an agent based on the agent's capacity. The agent's capacity may be configured to be, for example, a maximum of 1 call, 3 emails, and 4 chat interactions concurrently. According to an embodiment, the routing server 20 adheres to the configured capacity limits, and no additional interactions will be routed to a target if that target's capacity has been reached. If an agent rejects a new chat session, the system redirects the chat session to another agent based on the other agent's capacity.

Figure 11A:
FIGS. 11A-11B are screen shots of an active chat interaction of a mobile application according to an embodiment of the invention.
Figure 11B:
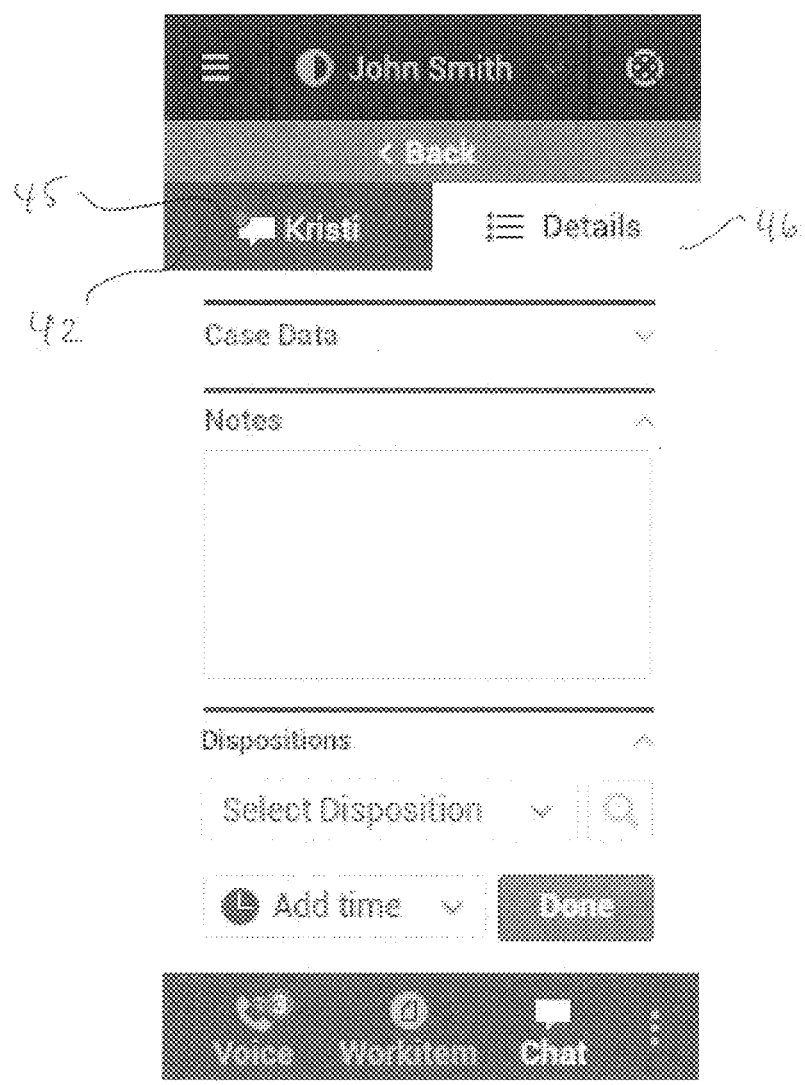

FIGS. 11A-11B are screen shots of an active chat interaction of a mobile application according to an embodiment of the invention. According to an embodiment, the screen depicted in FIG. 11A is triggered by selecting the name of a chatting party (e.g., "Kristi") from a chat home screen. When the chat sessions tab 42 is selected as shown in FIG. 11A, the management interface module 80 displays a transcript of the chat interaction. According to an embodiment, the active chat interaction screen includes a plus icon 44 that provides an expanded menu of options for initiating a consultation during the chat interaction and for ending the chat interaction. According to an embodiment, the consultation could be initiated from and conducted over any channel and is not limited to a chat consultation. In one example, when an agent is selected from a list for the consultation, the management interface module 80 presents an option to select a channel and then begin the consultation. For example, if a voice consultation is started from a chat window, a direct call may be placed to the called party, or two calls may be triggered to both parties and the calls legs may be bridged once the parties answer the calls. In the screen depicted in FIG. 11B, a Details tab 46 provides Case Data about the interaction, a Notes section for the user to enter notes about the interaction, a Dispositions tab, and an "Add time" menu. In one embodiment, the management interface module 80 is configured to extend an agent's wrap-up time beyond a default wrap-up time in response to selection of the "Add time" option. According to an embodiment, the management interface module 80 is configured to switch between the chat sessions tab 42 and the Details tab in response to a user clicking on the tabs. As shown in FIG. 11B, in one embodiment an icon 45 on the chat sessions tab 42 has an update indicator indicating the presence of interactions pending a response.

Figure 12A:
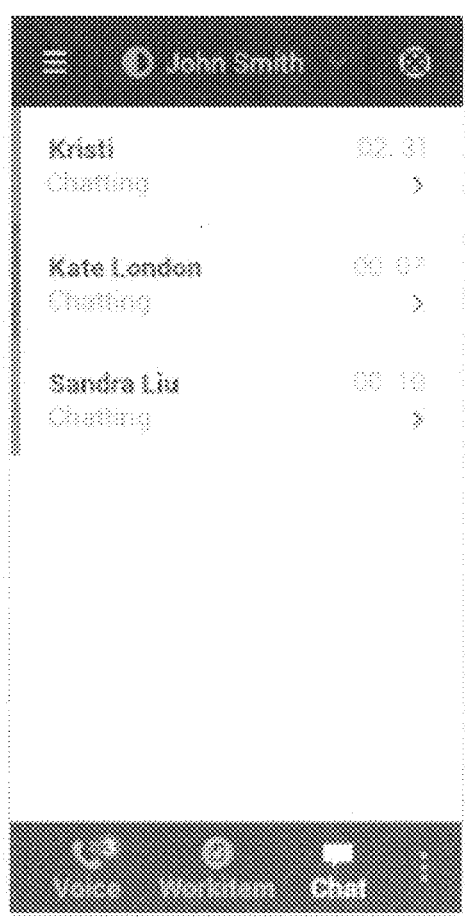
FIGS. 12A-12C are screen shots of a concurrent chat interactions scenario of a mobile application according to an embodiment of the invention.
Figure 12B:
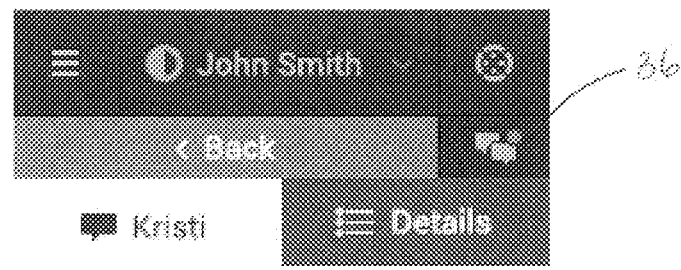
Figure 12B:
Figure 12B:
Figure 12C:
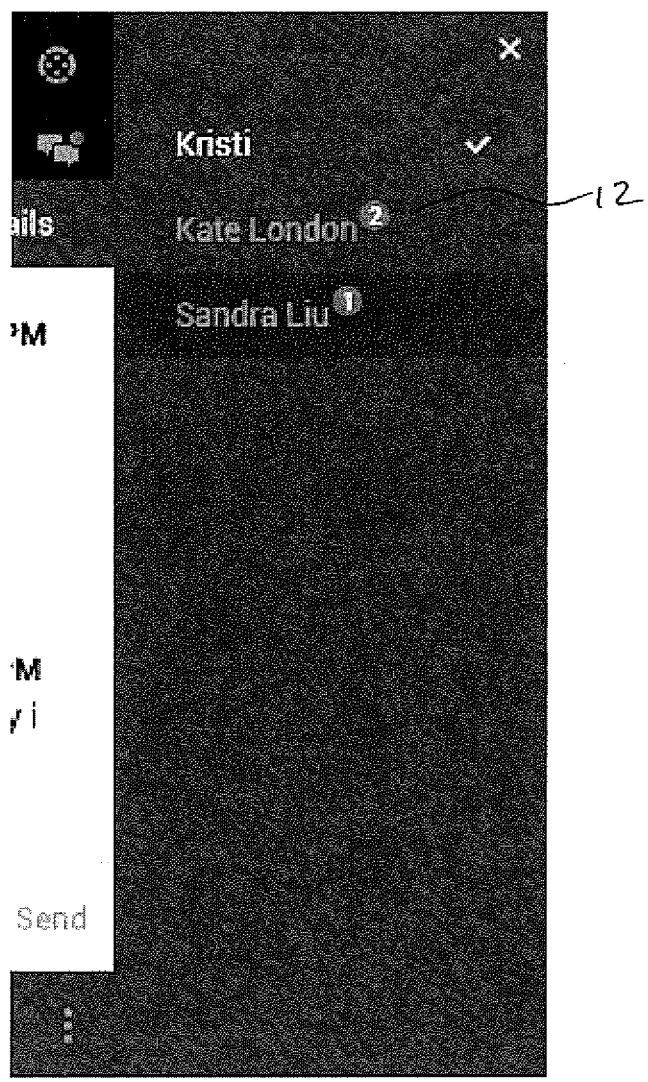

FIGS. 12A-12C are screen shots of a concurrent chat interactions scenario of a mobile application according to an embodiment of the invention. In the chat screen depicted in FIG. 12A, an agent is chatting with 3 users, and thus, there are 3 concurrent chat interactions listed in the chat home screen. According to an embodiment, selecting a name of a chatting party (e.g., "Kristi") triggers the screen in FIG. 12B. Because there are multiple concurrent chat interactions, the management interface module 80 displays a multiple chat interactions icon 36. In one embodiment, the multiple chat interactions icon 36 has an update indicator for indicating the presence of chat interactions that are pending a response. According to an embodiment, selecting the multiple chat interactions icon 36 triggers a "slide in" window with a list of multiple live chat interactions as shown in FIG. 12C. In the list shown in FIG. 12C, each name of a chatting party has an update icon 11 that indicates a number of chat interactions with that party pending a response. The management interface module 80 is configured to display a transcript of a chat with a party in response to a user selecting the chatting party's name.

Figure 13A:
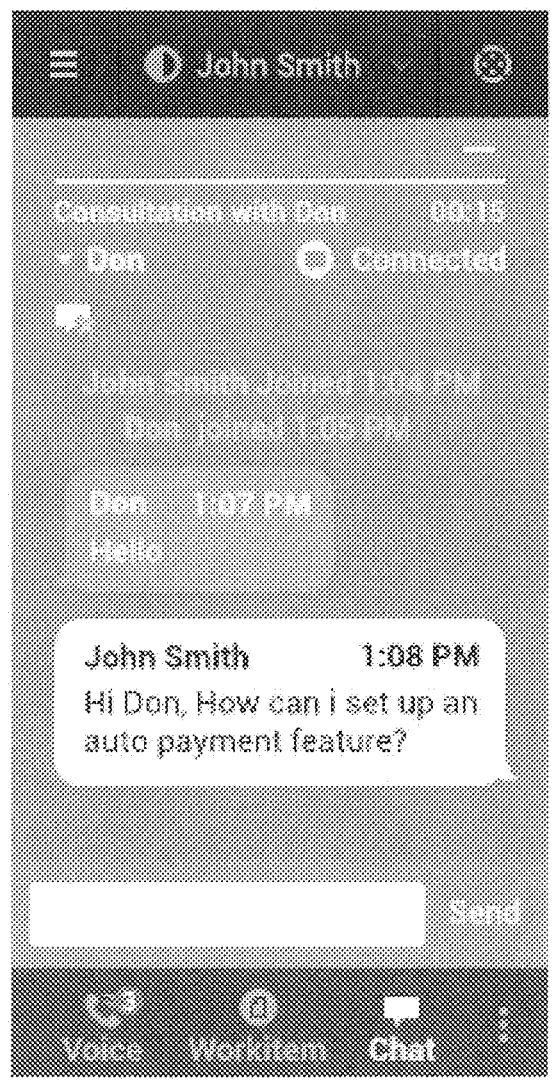
FIGS. 13A-13D are screen shots of a consultation in a chat channel of a mobile application according to an embodiment of the invention.
Figure 13B:
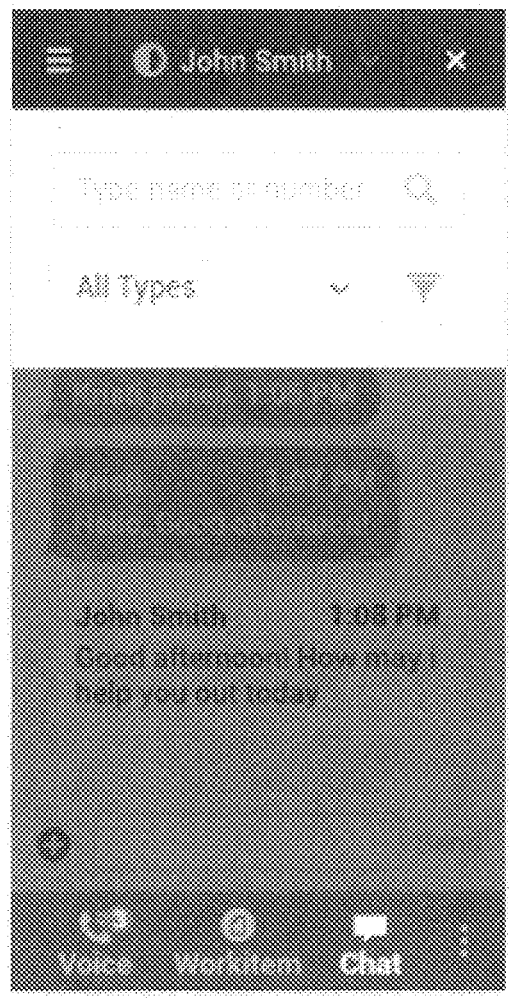
Figure 13C:
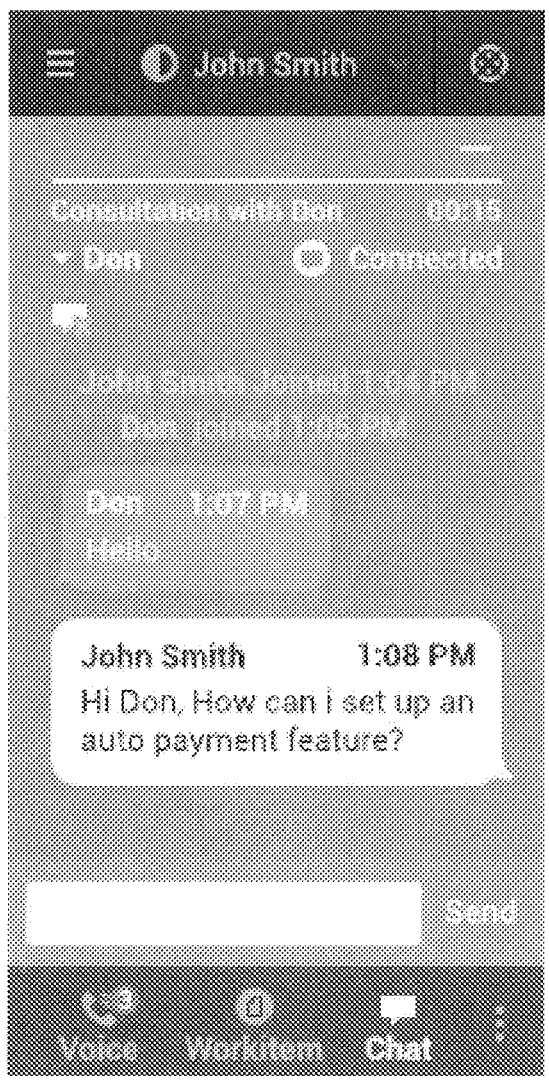

According to an embodiment, the management interface module 80 provides the screen depicted in FIG. 13A in response to a user selecting the Consultation option in FIG. 11A. The Consultation option allows a user to confer with another user (e.g., an agent or supervisor) during a current interaction session. When the Consultation option is selected, as shown in FIG. 13B, the management interface module 80 provides a pop-up window for the user to access the team communicator for selecting another user to consult with. After the consulting party is selected using the team communicator, the management interface module 80 displays a chat session screen for the consultation as shown in FIG. 13C. In one embodiment, the management interface module 80 is further configured to add another user to a current interaction. For example, in FIG. 13D the current interaction is a chat between a customer, "Kristi," and a first agent, "John Smith." According to an embodiment, a second agent, "Don," is added to the interaction after the first agent engages in a consultation with the second agent.

Figure 13D:
Figure 14:
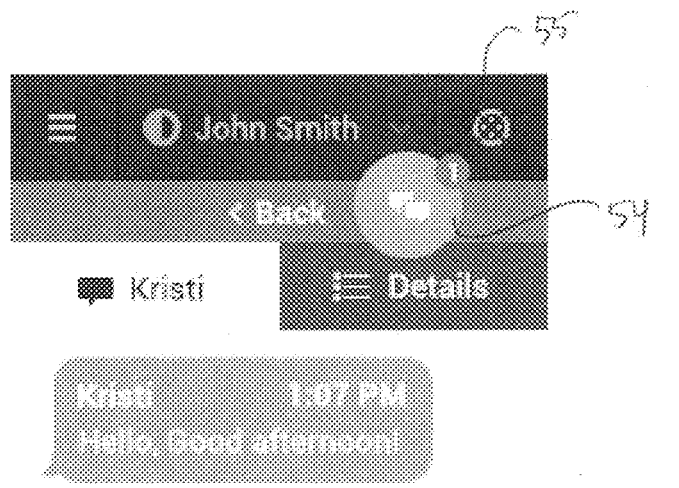
FIG. 14 is a screen shot of a concurrent chat and consultation scenario of a mobile application according to an embodiment of the invention.
Figure 14:
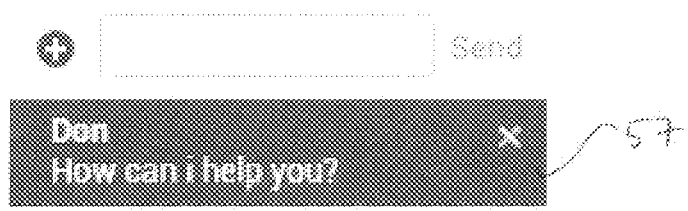

According to an embodiment, the consultation screen in FIG. 13C is displayed in a screen or window that covers the transcript of the current chat (e.g., the chat with a customer). The management interface module 80 may be configured to hide (or minimize) or unhide (or maximize) the consultation screen in response to a user command. In one embodiment, both the chat interaction with the customer as well as the consultation interaction may be active at the same time, with the user being able to transition effortlessly from one interaction to another. In this regard, as shown in FIG. 13D, while the current display area is occupied with the chat interaction with the customer, the consultation session is represented by a transparent or semi-transparent icon that is layered over the current chat session screen. In FIG. 14, for example, the management interface module 80 represents the consultation session as a transparent floating bubble icon 54. The bubble icon 54 is layered over the active chat session screen so that the chat transcript is still visible. A user can switch back to the consultation session by clicking on the icon. In some embodiments, the user can reposition the bubble icon 54 anywhere on the display screen via, for example, dragging the icon and dropping it on a desired location of the screen. The icon may have any suitable degree of transparency to allow a user to view an active interaction session behind the icon. For example, in one embodiment, the icon has an opacity of 92%.

According to one embodiment, the icon has an update indicator 55 for depicting a number of interactions that are pending a response, as shown in FIG. 14. The update indicator 55 in the example of FIG. 14 indicates that there is one new (or unread) message in the interaction represented by the icon. According to an embodiment, the display screen may further display a pop-up message 57 when a user receives a new message. The pop-up message 57 displays the entirety or a portion of the most current message received in the interaction. Clicking on the pop-up message 57 will lead the user to the corresponding chat session. The pop-up message 57 may automatically disappear after a time period (e.g., 7 seconds) or the user may manually close the message by clicking the "X" button.

According to an embodiment, graphical attributes of the icon, including the color, size, shape, orientation, and position of the icon, correspond to attributes of the represented interaction. In one embodiment, the icon color and a picture displayed on the icon (e.g., a pair of headphones, a telephone, or rectangular speech bubbles) may identify a specific party (e.g., a specific agent), a channel type (e.g., voice, chat) and/or an interaction type (e.g., consultation). For example, a red icon with a telephone graphic may represent a voice interaction with a customer. The icon may also have dynamic movement features such as blinking or rotating.

In the embodiment described above with respect to FIG. 14, the icon may be overlaid on top of a current interaction between an agent and a customer, and the icon may depict a separate interaction between the agent and another agent. However, embodiments of the present invention are not limited thereto. For example, the icon may be overlaid on top of a current interaction between an agent and a customer, and the icon may represent the same interaction. In addition, icons may be used to depict interactions with customers even before such interactions are picked up for handling by an agent. According to an embodiment, the management interface module 80 may display more than one icon on a user's screen if the user is engaged in multiple interactions with other agents or contacts, and the interactions may belong to one or more channels.

According to one embodiment, the position of the icon is dynamically updated by the management interface module 80 based on how the interaction satisfies (or fails to satisfy) a KPI determined by the enterprise. The KPI may relate to service levels, revenue, customer satisfaction, or any other business metric set by the enterprise.

In one example, the management interface module 80 may be configured to set a position of the bubble icon at the top of the screen, and further be configured to automatically move the bubble icon downward (e.g., in a falling motion) toward the bottom of the screen based on a handling time set for the particular type of interaction that is depicted by the icon. In one example, the falling rate of the bubble icon may depend on a handling time desired for the particular type of interaction. For example, if the desired handling time for this type of interaction is 10 minutes, and the display screen is 5 inches long, the management interface module 80 may move the bubble icon ½ inch for every minute spent handling the interaction. Of course, finer gradations of the movement may be depicted as will be appreciated by a person of skill in the art. According to one embodiment, in order to calculate the falling rate, the management interface module 80 is configured to identify the particular user device that is being used by the user for determining the dimensions of the display screen specific to the user device.

Figure 15:
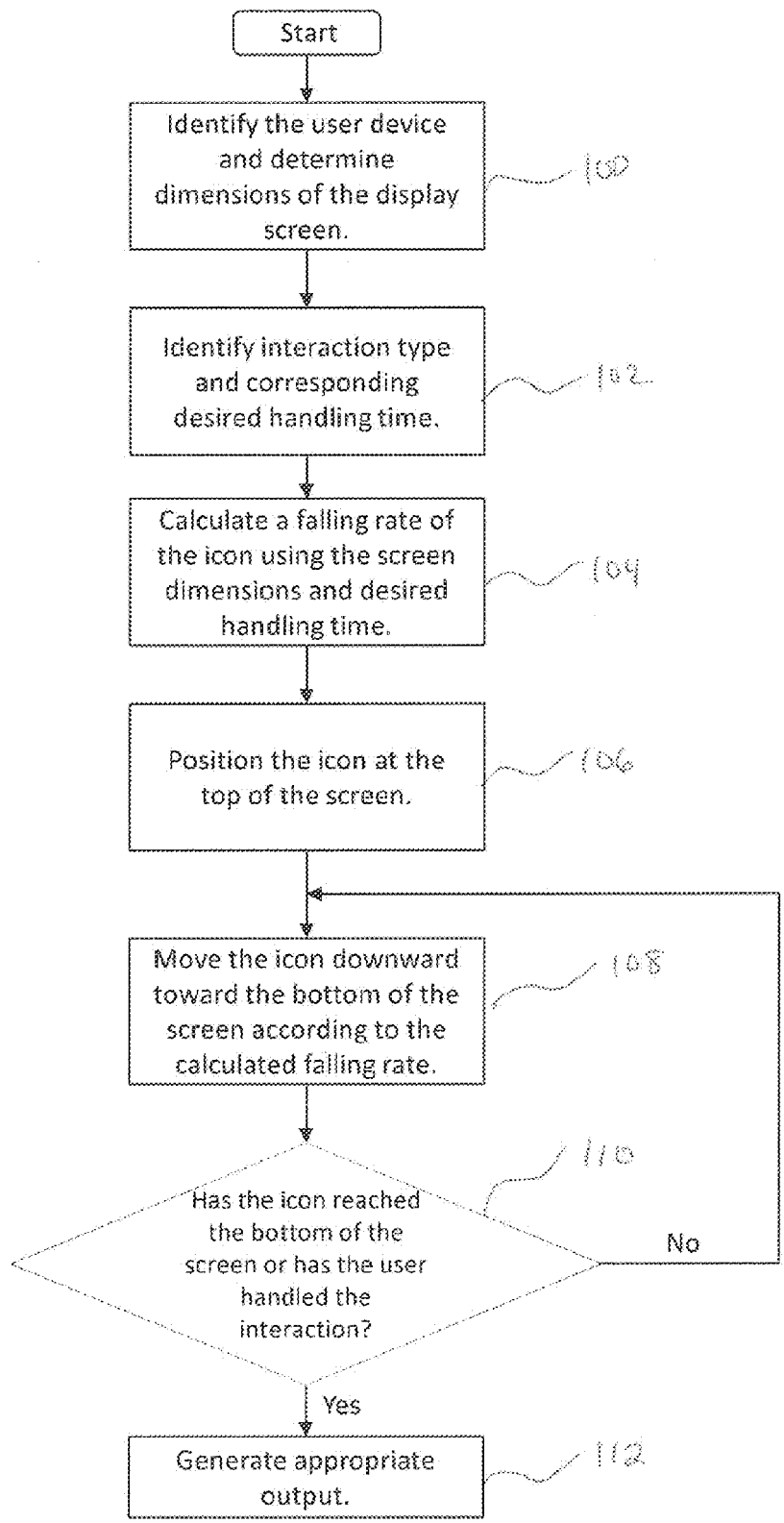
FIG. 15 is a flow diagram of a process for managing interactions using an icon according to an embodiment of the invention.

FIG. 15 is a flow diagram of a process for managing interactions using an icon that is automatically moved downward (e.g., in a falling motion) toward the bottom of the screen based on a time-dependent KPI, according to an embodiment. At act 100, the management interface module 80 identifies the particular user device that is being used by the user and determines the dimensions of the display screen of the user device. At act 102, the management interface module 80 identifies the interaction type and the corresponding desired handling time set by the enterprise. At act 104, the management interface module 80 calculates a falling rate of the icon using the screen dimensions and desired handling time. For example, the management interface module 80 may determine the falling rate by dividing a length of the screen by the number of minutes of desired handling time. At act 106 the management interface module 80 initially positions the icon at the top of the screen. At act 108 the management interface module 80 automatically moves the icon downward toward the bottom of the screen according to the calculated falling rate. At act 110, the management interface module 80 checks to see if the icon has reached the bottom of the screen or the user has handled the interaction. If either condition is met, the process generates an appropriate output. For example, if the icon has reached the bottom of the screen, the process may output a negative result and may deduct points from the user's bank of points. If the user handles the interaction before the icon reaches the bottom of the screen, the process may output a positive result and may add points to the user's bank of points. If neither condition is met, the management interface module 80 continues to move the icon downward until one of the conditions is met.

In another example, the management interface module 80 may be configured to automatically move the bubble icon at different rates proportional to a KPI of the enterprise for the particular type of interaction that is represented by the icon. In one example, if the maximum acceptable wait time for this type of interaction is 10 minutes based on a KPI related to a wait time threshold, the management interface module 80 may move the bubble icon downward toward the bottom of the screen at an increasing rate as the wait time threshold approaches. For example, if the display screen is 5 inches long, each inch of movement on the screen from the top to the bottom may represent 2 minutes of actual elapsed wait time for the transaction. The management interface module 80 may move the bubble icon downward at a rate of ¼ inch per minute for the first 6.67 minutes of elapsed wait time, and may move the bubble icon downward at an increased rate of 1 inch per minute for the remaining 3.33 minutes until the bubble icon reaches the bottom of the screen. If the bubble icon reaches the bottom of the screen, the wait time threshold has been exceeded. According to one embodiment, in order to calculate the falling rates, the management interface module 80 is configured to identify the particular user device that is being used by the user for determining the dimensions of the display screen specific to the user device.

According to an aspect of embodiments of the present invention, managing interactions can be analogous to a playing a game in which the user's objective is to prevent the icons (e.g., bubbles) from "falling" to the bottom of the screen (or reaching some other undesired state). In one embodiment, the management interface module 80 may be configured to award points or other rewards to users who handle interactions in accordance with KPIs, and may further be configured to deduct points or issue penalties to users who do not satisfy KPIs. For example, if a user does not handle an interaction before the interaction's bubble icon falls to the bottom of the screen, the management interface module 80 may deduct points or may remove privileges previously earned by the user. In one example, the management interface module 80 may be configured to route fewer interactions to a user who has low performance as indicated by a low number of points. According to an embodiment, the management interface module 80 may be configured to make users' points visible to other users in order to promote competition among users. The gamification of handling interactions thus allows users to address and solve problems in a more engaging and entertaining manner, which can lead to an improvement in overall enterprise performance.

Although some of the embodiments described herein relate primarily to time-dependent service levels, other service levels could be implicated such as number of transfers or number of attempts (e.g., repeat interactions) in order to resolve a customer request.

According to aspects of embodiments of the present invention, gamification may be implemented in a variety of different ways. For example, in one embodiment the management interface module 80 may permit a user to "grab" an icon representing an interaction and "trade" it with another user for points, in order to protect a performance KPI. As such, an available agent might be willing to handle an interaction and gain points, which could improve overall utilization of the enterprise.

The gamification of interaction management according to aspects of embodiments of the present invention can be extended outside the individual mobile device context to a team environment. That is, in one embodiment the management interface module 80 may provide a team of users (e.g., a team of agents) with access to a wall board on which all icons displayed on all team members' devices are visible. Any team member may select an icon that is nearing a limit (e.g., a falling "lower" bubble that is near the bottom of the screen) in order to help meet service objectives of the enterprise. According to an embodiment, if a single team member is unable to address an interaction, the graphical attributes of an icon for the interaction serve as an indicator to other team members of the interaction's status. An available team member viewing the wall board on his or her desktop or mobile device may claim the icon (e.g., by dragging the icon to a personal work bin or other identifier) before a service limit is reached (e.g., before the bubble icon falls to the bottom of the screen), then click on the icon to display the interaction for handling.

According to an embodiment, the management interface module 80 is configured to identify a first interaction between a customer and a first agent, and identify a first icon associated with the first interaction, where the icon is displayed on a user device of the first agent. The user device of the first agent is coupled to a network of user devices communicating with the management interface module 80. The management interface module 80 is further configured to identify icons on all user devices on the network, and display the identified icons to each agent (e.g., on the agent's mobile device or desktop). The management interface module 80 is further configured to detect selection of the first icon and dropping of the first icon to an identifier of a second agent. The management interface module 80 retrieves an interaction object associated with the first icon and retrieves data associated with the second agent. The management interface module 80 establishes a second interaction connection between the customer and the device of the second agent, and replaces the first interaction connection (between the customer and the first agent) with the second interaction connection.

However, embodiments of the present invention are not limited to instances of gamification. An icon representing an interaction may be modified or manipulated in any number of ways to indicate the status of the interaction. For example, in one embodiment, a ring representing a timer appears around the bubble icon 54, and segments of the ring disappear as a limit corresponding to a KPI is approached.

According to an embodiment, multiple icons may be displayed on the screen at one time and the color and/or size of the icons may correspond to a priority of each interaction relative to other interactions. For example, an interaction having a high priority may be represented by a red icon that is larger than icons for interactions with lower priorities.

Figure 16:
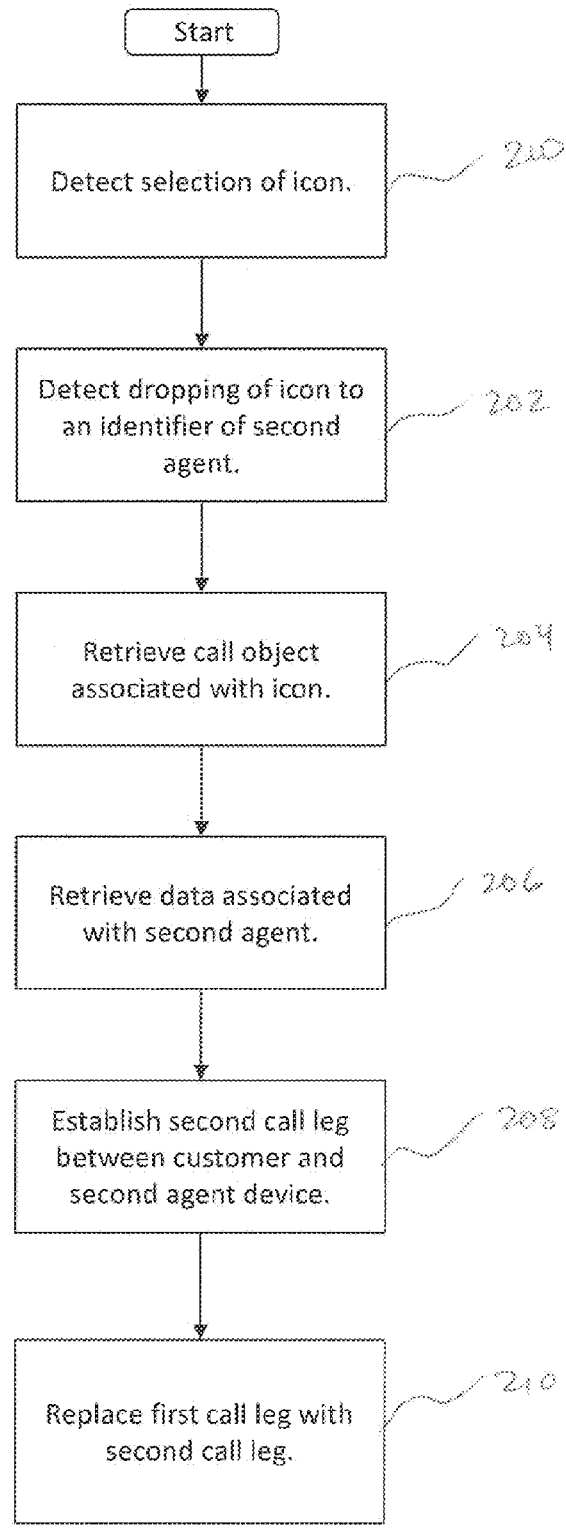
FIG. 16 is a flow diagram of a process for transferring a voice call in response to a drag-and-drop input according to an embodiment of the invention.

In one embodiment, a user can drag and drop an icon to perform an action relative to the corresponding interaction, such as transferring the interaction to another agent. For example, a user can drag the bubble icon 54 to a transfer consultation button, thereby transferring the consultation session to another agent. FIG. 16 is a flow diagram of a process for transferring a voice call (or telephony call) between a customer and a first agent to a second agent in response to a drag-and-drop input. At act 200, the management interface module 80 detects selection of an icon associated with the voice call. At act 202, the management interface module 80 detects dropping of the icon to an identifier of a second agent. At act 204, the management interface module 80 retrieves the call object associated with the icon. In one embodiment, the call object is established as soon as the interaction is received by the contact center. The call object maintains all data about the interaction including a session ID representing that interaction, calling number, called number, interactive voice response (IVR) selections, any data exchanged during the interaction, and interaction history. The call object may also maintain an icon ID to identify the corresponding graphical representation of the interaction and associated metadata on the icon (e.g., position of the icon on the screen). At act 206, the management interface module 80 retrieves data associated with the second agent. At act 208, the management interface module 80 establishes a second call leg between the customer and a device of the second agent. At act 210, the management interface module 80 replaces the first call leg with the second call leg, establishing a connection between the customer and the second agent.

Figure 17A:
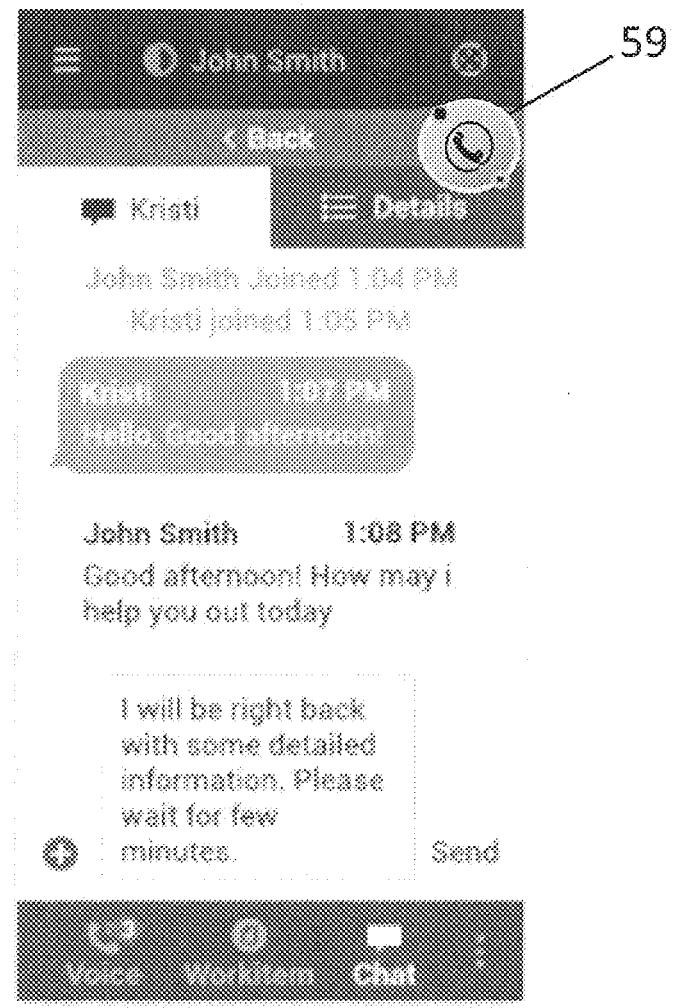
FIGS. 17A and 17B are screen shots of an icon of a mobile application according to an embodiment of the invention.
Figure 17B:
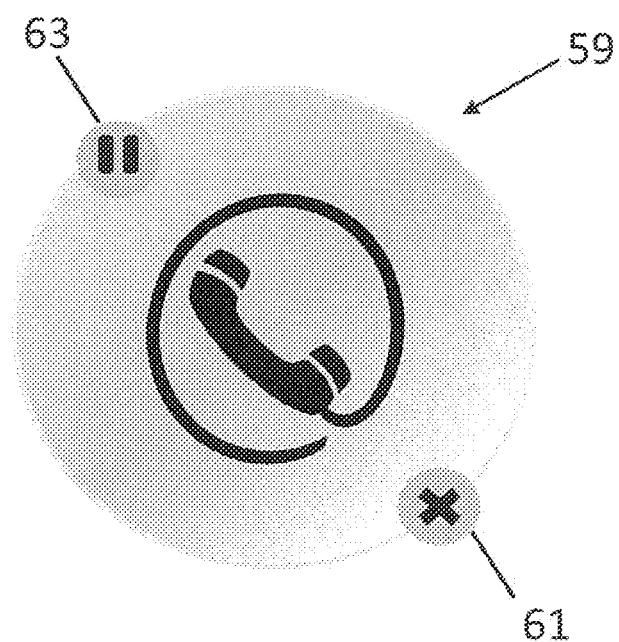

Although in FIG. 14 the bubble icon 54 represents a chat interaction, embodiments of the present invention are not limited thereto, and icons may represent other interaction types or media types (e.g., voice, email). According to some embodiments, an icon may be embedded with controls such that the management interface module 80 can perform additional actions such as muting or disconnecting the corresponding interaction in response to a user command, while the user is still participating in the current interaction. Thus, according to an embodiment, the icon is a software object with programmed logic that can be activated via graphical interaction with the icon. For example, as shown in FIG. 17A, a user may be engaged in a chat session and an icon 59 corresponding to an active voice interaction may be displayed overlaying the chat session. FIG. 17B is an exploded view of the icon of FIG. 17A. As shown, the graphical presentation of the icon 59 on the screen may further include an overlay of buttons such as a disconnect button 61 to disconnect the call and a pause button 63 to pause the call. The management interface module 80 can therefore disconnect or pause the voice call in response to a user command while the user is still viewing the chat session screen.

According to aspects of embodiments of the present invention, an icon representing an interaction may be used to simplify interaction management from the point of view of a customer interacting with an agent of an enterprise. According to an embodiment, a customer may interact with an agent via an application on the customer's desktop or mobile device. The application may be accessed via a web-based interface or a widget provided by the enterprise. In a case where an active interaction session between a customer and an agent is to be paused or suspended, the customer can select an embedded control within the icon to send a command to pause the interaction. For example, the management interface module 80 may be configured to provide both the customer and the agent with access to the same icon (e.g., via screen sharing or by providing two renderings with a common model and controller). The user may pause the interaction by clicking on a graphical presentation of a pause button on the icon. The management interface module 80 is configured to modify the attributes (both the appearance of the graphical presentation and the underlying programmed logic) of the icon in response to the user command to indicate that the interaction is in a paused mode. For example, the management interface module 80 may change the icon from green to yellow, may increase the transparency of the icon, or may move the icon to another area of the screen (e.g., off to the side of the screen).

In one embodiment, the management interface module 80 provides a graphical presentation of the icon to a team wall board so that members of the agent's team can view the status of the paused interaction. When the customer later returns to the resume the interaction (e.g., by clicking on a graphical presentation of a resume button on the icon), the management interface module 80 may modify the attributes of the icon (both the appearance of the graphical presentation and the underlying programmed logic) in response to the user command to indicate that the interaction is now in a resumed mode. For example, in the case of a "falling" bubble icon, the management interface module 80 may change the color of the bubble (e.g., from yellow to green) to indicate the resumed mode and may re-commence the downward "falling" of the bubble based on a KPI associated with the interaction. A wall board scenario may be particularly useful where the original agent interacting with the customer is no longer available at the time when the customer resumes the interaction. Other members of the agent's team can see the change in the interaction's status by viewing the icon, and can claim the icon before the limit is reached (e.g., by dragging and dropping the bubble to a personal work bin before the bubble hits the bottom of the screen). The team member may be part of the same contact center as the original agent or may be part of a different contact center.

According to an embodiment, an interaction object maintaining data about an interaction is established as soon as an interaction is received or initiated by the enterprise, and the interaction object gradually accumulates additional data during its lifetime. The management interface module 80 retrieves the interaction object associated with the icon when the icon is selected. As such, when a team member clicks on an icon of a resumed interaction, the management interface module 80 retrieves information about the interaction maintained by the interaction object, including a session ID representing that interaction, calling number, called number, IVR selections, any data exchanged during the interaction, and interaction history. Accordingly, the management interface module 80 makes this information accessible to the agent handling the resumed interaction, via the icon. Thus, according to aspects of embodiments of the present invention, implementation of icons by the management interface module 80 can simplify interaction management by providing a quick and effective way for a customer to pause and resume an interaction, while retaining information associated with the interaction to assist an agent handling the resumed interaction. Since all of the interaction data can be quickly and easily accessed via the icon, the management interface module 80 can efficiently redirect resumed interactions to other resources who can handle them in accordance with associated KPIs.

According to yet another aspect of embodiments of the present invention, the management interface module 80 utilizes icons to improve the accuracy of reporting. For example, an enterprise may periodically generate reports to provide insight into business performance by comparing the reported metrics against KPIs of the enterprise. One such metric may involve the total amount of time agents spend engaged in interactions. In a case where an agent is engaged in several concurrent interactions, adding up the total duration of all interactions may not provide an accurate picture of the agent's productivity. According to an embodiment, the management interface module 80 may designate (e.g., via an embedded control and in response to a user command) an icon of an active interaction as "in focus" for purposes of measuring the agent's activity. When an agent is not actively engaged in an interaction (e.g., the interaction is paused, or the customer is taking their turn chatting during a chat interaction), the management interface module 80 can designate a different interaction as "in focus." Thus, according to an embodiment the management interface module 80 takes into account the duration of only "in focus" interactions when calculating the amount of time an agent spent engaged in various activities.

Email Channel

Figure 18A:
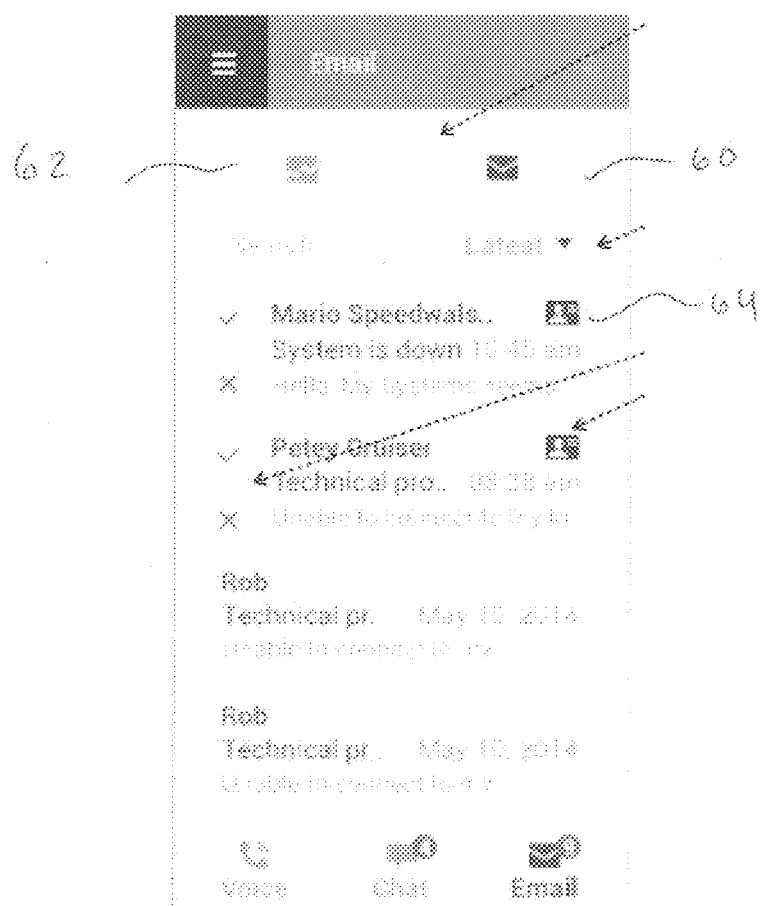
FIGS. 18A-18E are screen shots of an email channel of a mobile application according to an embodiment of the invention.

FIGS. 18A-18E are screen shots of an email channel of a mobile application according to an embodiment of the invention. In FIG. 18A, an email home screen includes an active emails tab 60 and a reports tab 62. In the active emails tab 60, the management interface module 80 displays calls to action (e.g., Accept and Reject buttons) and a case data icon 64 for each unread email. In one embodiment, the management interface module 80 is further configured to display case data for an unread email in response to a user's pointer device hovering over the case data icon 64.

Figure 18B:
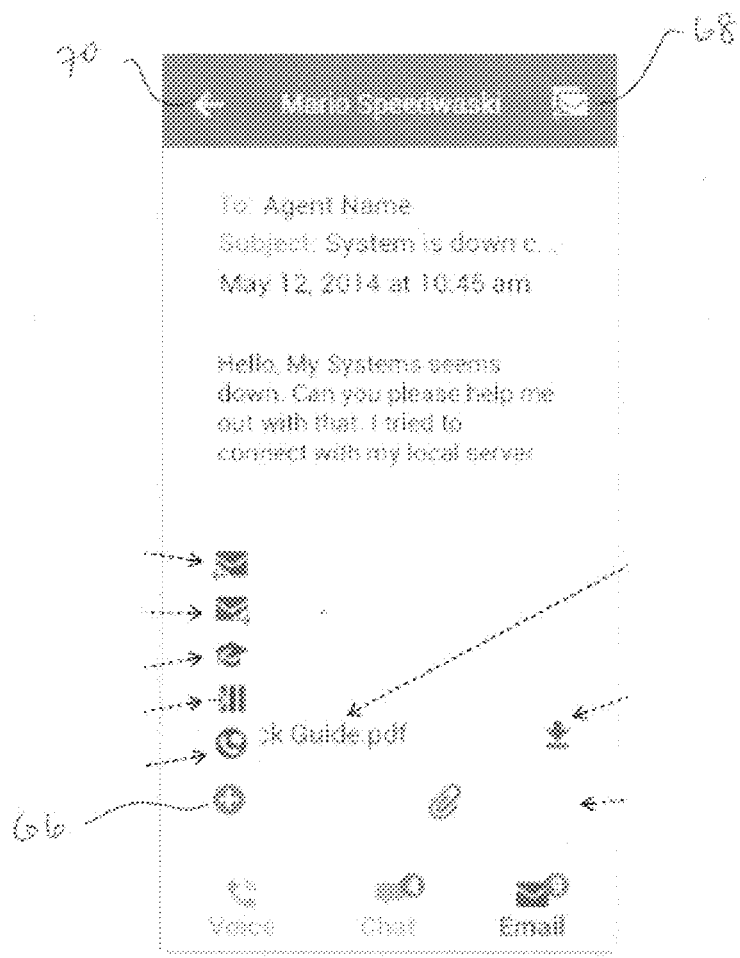
Figure 18C:
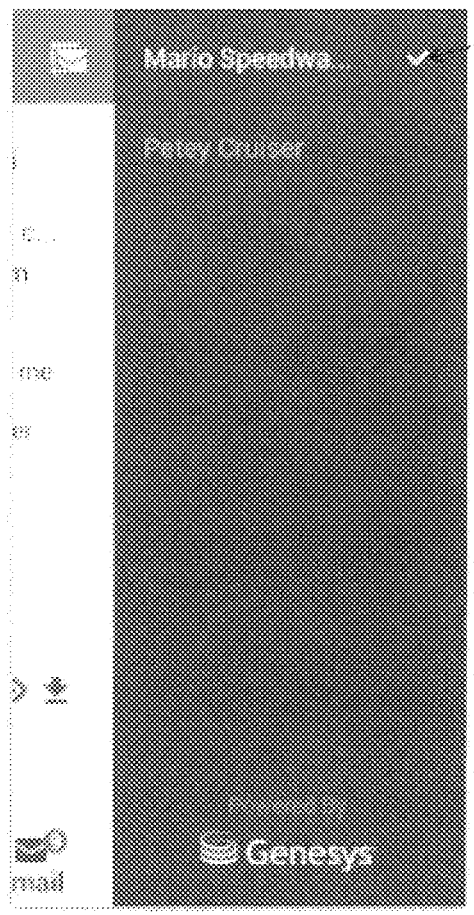

FIG. 18B is a screen shot of an email view screen when an email is accepted and viewed according to an embodiment of the invention. According to an embodiment, the management interface module 80 provides an expanded menu of options via a plus icon 66, including the options of (from top to bottom) Reply, Transfer, Skill Transfer (e.g., transferring an email interaction to a skill group so that any agent within that group could handle the interaction), Queues Transfer (e.g., transferring an email interaction to a queue, and other agents may be possible routing targets for interactions within the queue), and Voice Pages (e.g., a point in the email flow where certain automated action could be taken for that interaction). In one embodiment, management interface module 80 is configured to disable the Send button unless and until the user selects the Reply or Transfer options. The email view screen also includes an icon 68 that provides access to a list of active emails (shown in FIG. 18C) and an icon 70 to return to the email home screen (e.g., inbox).

Figure 18D:

FIG. 18D is a screen shot of an email wrap-up screen of a mobile application according to an embodiment of the invention. The management interface module 80 may be configured to automatically present the wrap-up screen when an agent is done responding to an email interaction. The email wrap-up screen includes the option to add more time to the interaction session, as well as add notes about the session. The management interface module 80 further provides a menu for setting an email result of the interaction, which may be similar to a disposition code, and an option to automatically set the user's status to "away" after the interaction is done. The management interface module 80 may also be configured to provide the wrap-up screen in response to a user command. For example, an agent handling an interaction may wish to write wrap-up notes, and the management interface module 80 may provide the wrap-up screen on demand, in response to the user's request. According to an embodiment, a similar scenario is possible for voice after-call-work.

Figure 18E:
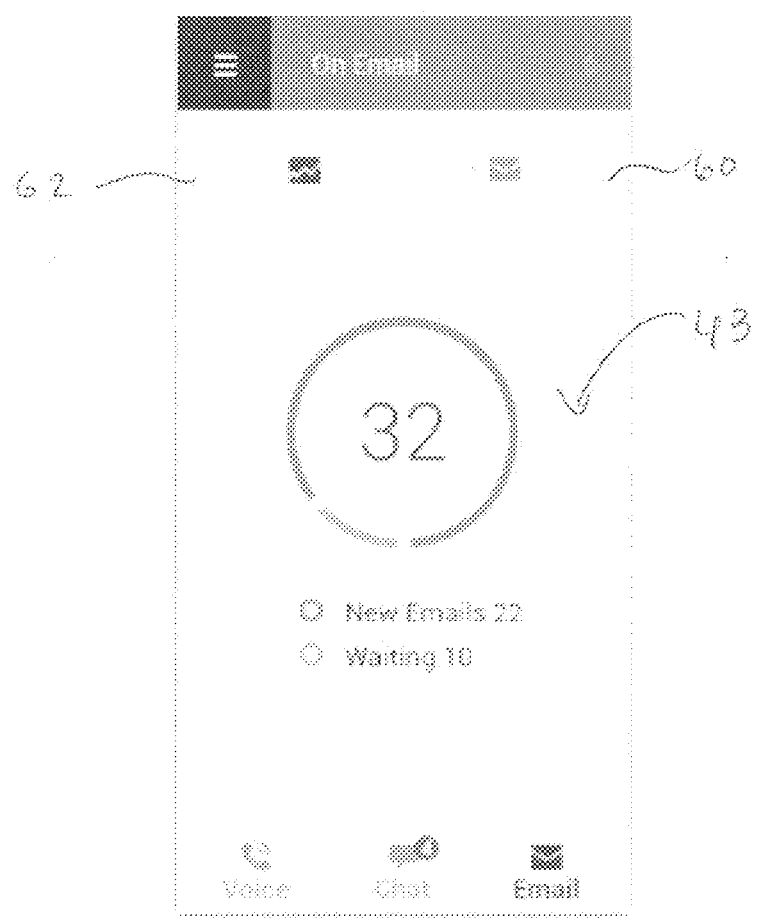

FIG. 18E is a screen shot of an emails report screen of a mobile application according to an embodiment of the invention. The management interface module 80 is configured to display the email reports screen in response to selection of the reports tab 62. According to an embodiment, the screen displays user-specific information such as the total number and individual numbers of new and waiting emails. The emails report screen shown in FIG. 18E also includes a graphical presentation 43 of the respective numbers of new and waiting emails for the user. In the graphical presentation 43, email interactions with different statuses (e.g., "new" and "waiting") are represented by a segment of the ring of the graphical presentation 43. In one embodiment, different segments are displayed in different colors.

Work Item Channel

Figure 19A:
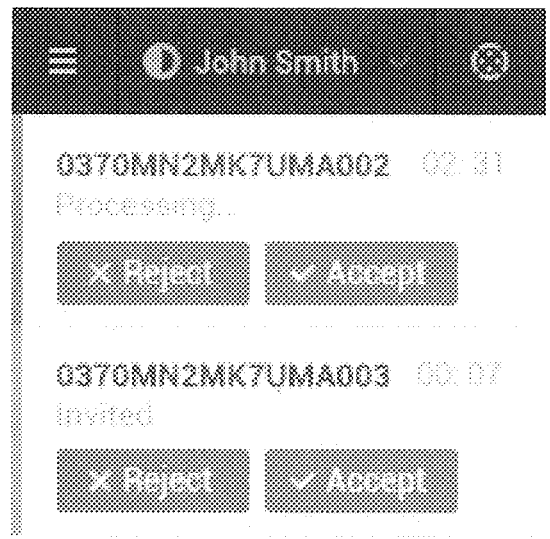
FIGS. 19A-19B are screen shots of a workitem channel of a mobile application according to an embodiment of the invention.
Figure 19A:
Figure 19B:
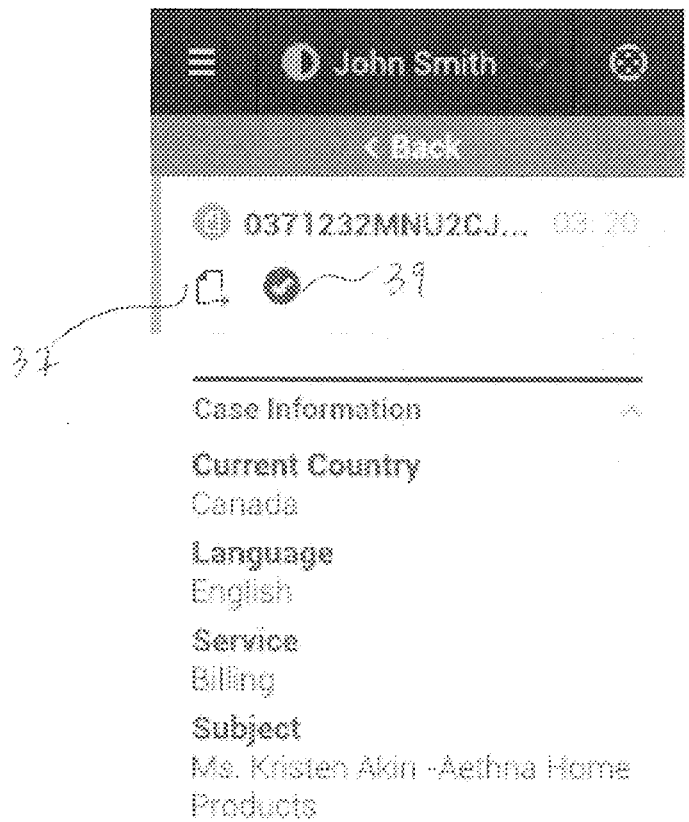

FIGS. 19A-19B are screen shots of a work item channel of a mobile application according to an embodiment of the invention. As shown in FIG. 19A, the management interface module 80 is configured to provide a list of work items to a user. In one embodiment, the management interface module 80 displays a work item ID, duration, and status (e.g., "Processing" or "Invited") for each work item in the list. The management interface module 80 further displays calls to action (e.g., Accept and Reject buttons) for each new work item. According to an embodiment, the management interface module 80 is configured to display the work item detail view in FIG. 19B in response to a user's selection of the work item from the list. In the example depicted in FIG. 19B, the work item detail view includes case information of the work item such as Current Country, Language, Service type, and Subject. The management interface module 80 is further configured to provide options for transferring the work item to another resource (e.g., by selecting the transfer icon 37) or marking the work item as completed (e.g., by selecting the check mark icon 39). In one embodiment, the displayed "Case Information" of FIG. 19B may relate to a case that includes a logical grouping of interactions or tasks of any media (e.g., chat, voice, email, work item). For example, a case may include all interactions or tasks belonging to a given insurance claim processing.

Outbound Campaigns

Figure 20A:
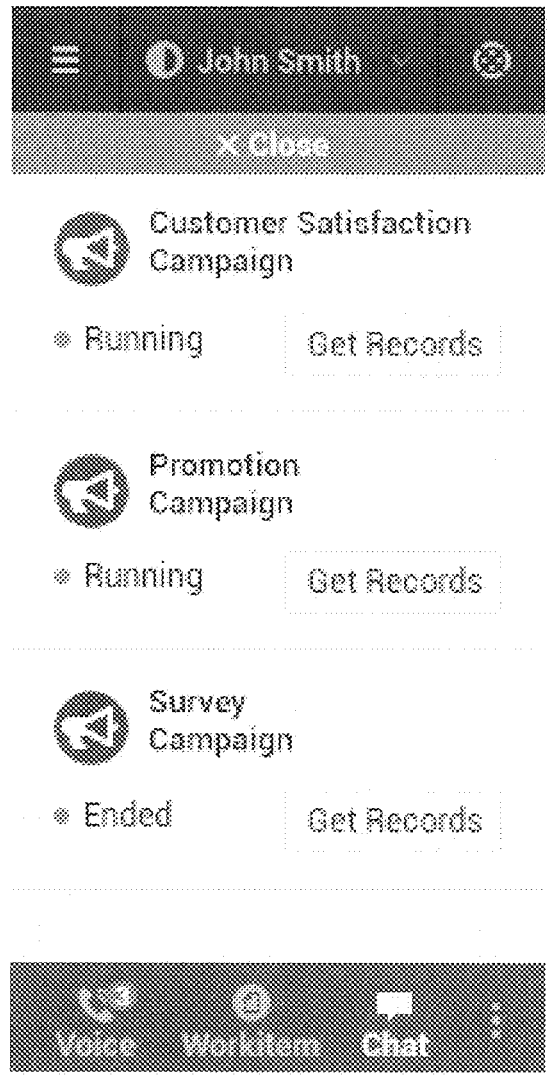
FIGS. 20A-20D are screen shots of an outbound campaigns menu of a mobile application according to an embodiment of the invention.
Figure 20B:
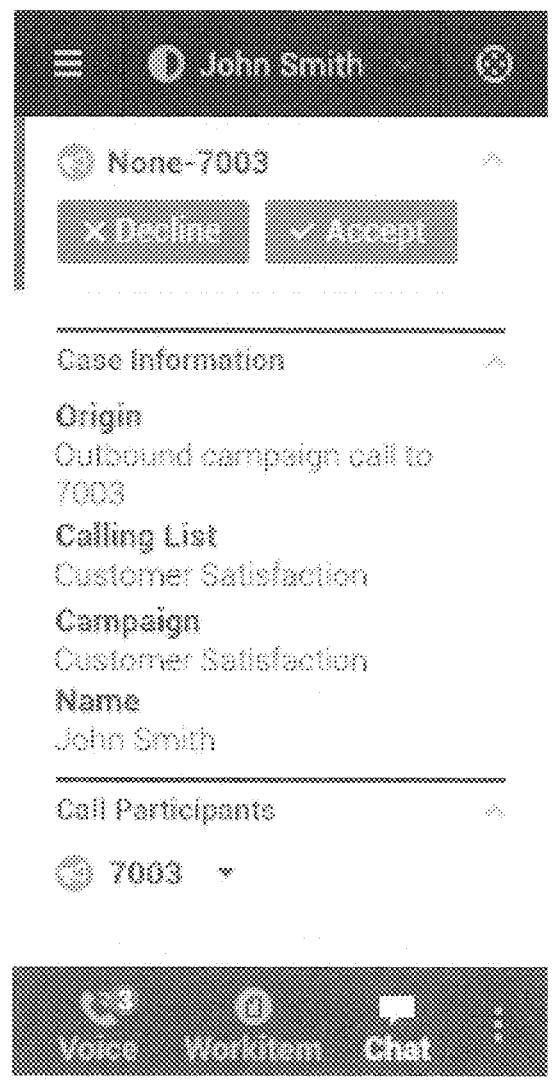
Figure 20C:
Figure 20D:
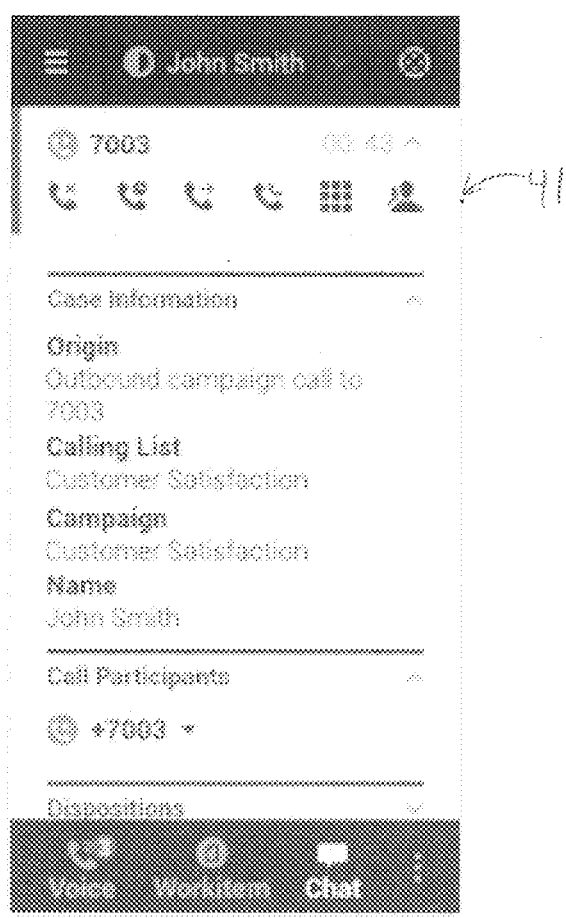

According to an embodiment, an enterprise may manage campaigns via the management interface module 80. Representative campaigns include customer satisfaction campaigns, promotion campaigns, survey campaigns, and campaigns for other purposes such as informing about changes in business conditions, reminding about approaching deadlines (e.g., tax filing deadlines), and providing alerts. FIGS. 20A-20D are screen shots of an outbound campaigns menu of a mobile application according to an embodiment of the invention. In one embodiment, the management interface module 80 is configured to display the campaign status screen shown in FIG. 20A in response to selection of the Outbound Campaigns icon 33 in FIG. 3A. In the example shown in FIG. 20A, each campaign in the list includes a status identifier (e.g., "Running" or "Ended") with an accompanying colored status dot, and a "Get Records" button. According to an embodiment, the management interface module 80 presents an interaction to an agent in response to selection of the "Get Records" button. The presented case information screen in FIG. 20B provides data about a contact in a campaign, and further provides calls to action (e.g., Accept and Decline buttons) relative to the contact. In order to place a call to the displayed contact, an agent selects the "Accept" button. As shown in FIG. 20C, in one example embodiment the "Decline" button provides the further options of calling the contact later or not calling the contact. In the embodiment shown in FIG. 20D, after the contact is accepted and an interaction with the contact is established, the management interface module 80 provides access to an expanded menu 41 of options for handling the interaction. In one embodiment, the options for a voice interaction are (from left to right): End Call, Hold Call, Instant Call Transfer, Instant Call Conference, Keypad, and Consult. If an interaction is declined, the management interface module 80 returns the user to the screen shown in FIG. 20A. In some embodiments, the "Decline" option may be disabled. For example, certain types of campaigns may include regulations for fast connection to a live agent, so the "Decline" option is disabled. Also, according to an embodiment, in a preview mode of the management interface module 80, a call may be dialed only after the agent accepts the call. However, the management interface module 80 may provide other modes such as progressive and predictive modes in which a call is dialed without waiting for agent acceptance. In such modes, the "Decline" option is disabled.

Figure 21A:
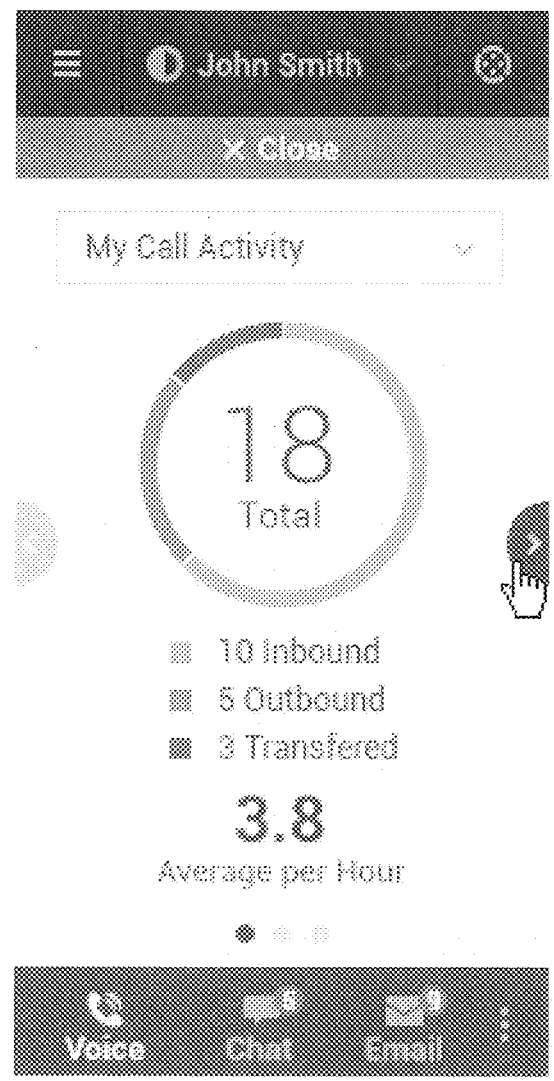
FIGS. 21A-21H are screen shots of reports and statistics of a mobile application according to an embodiment of the invention.
Figure 21B:
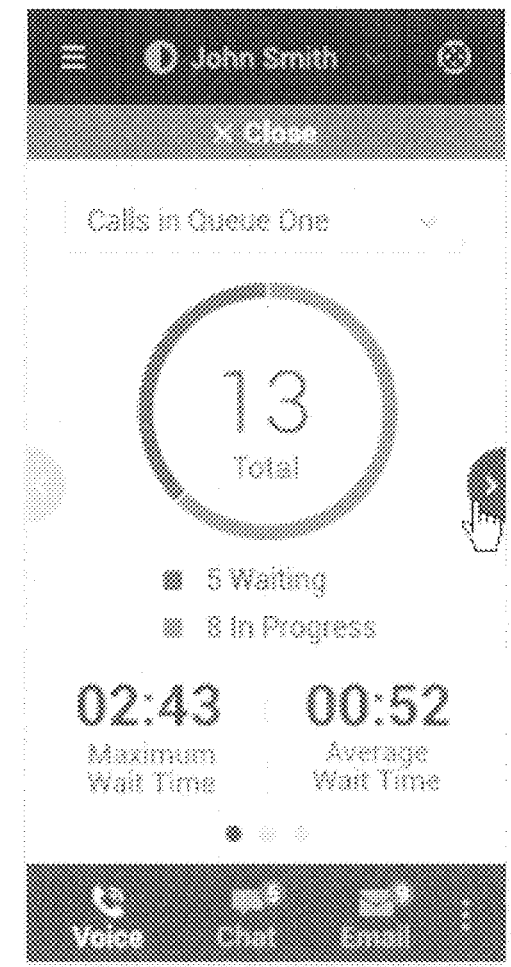
Figure 21C:
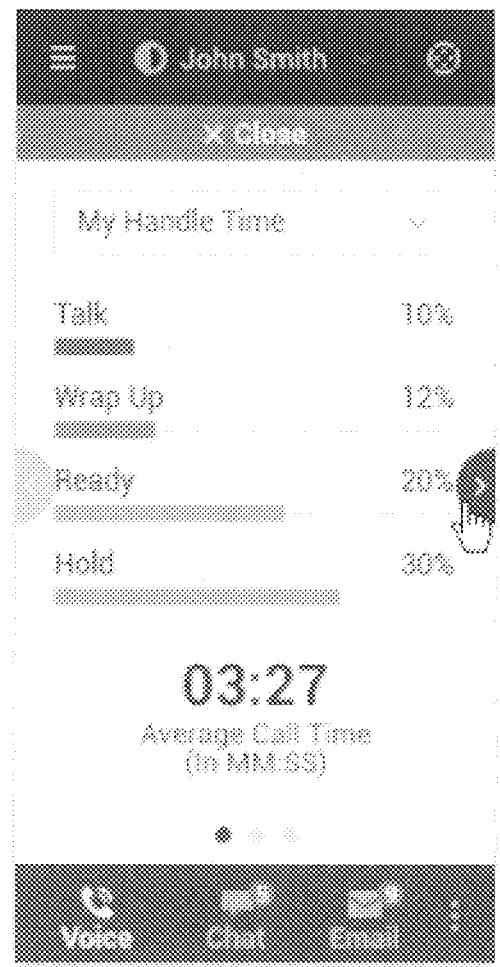
Figure 21D:
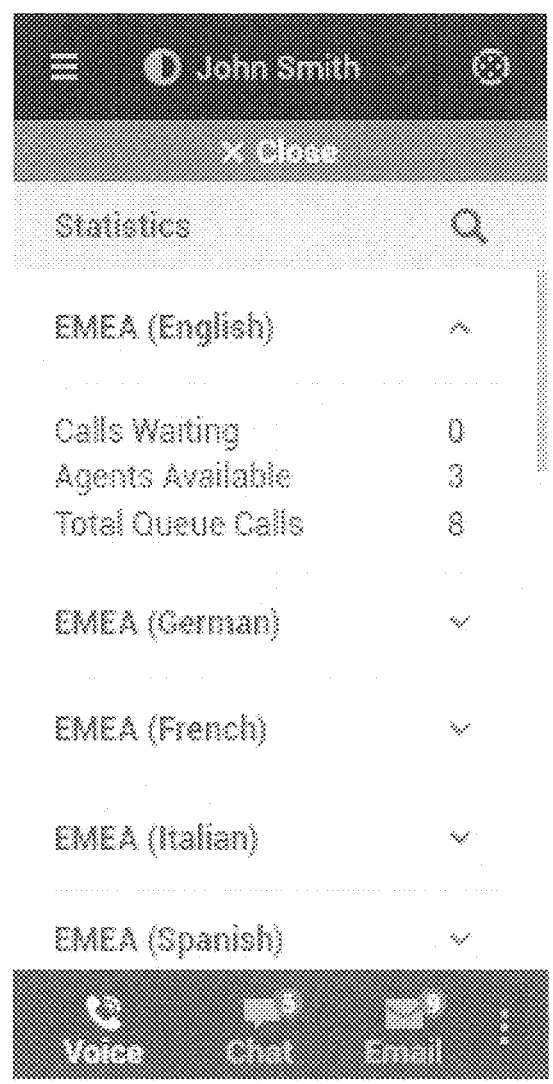
Figure 21E:
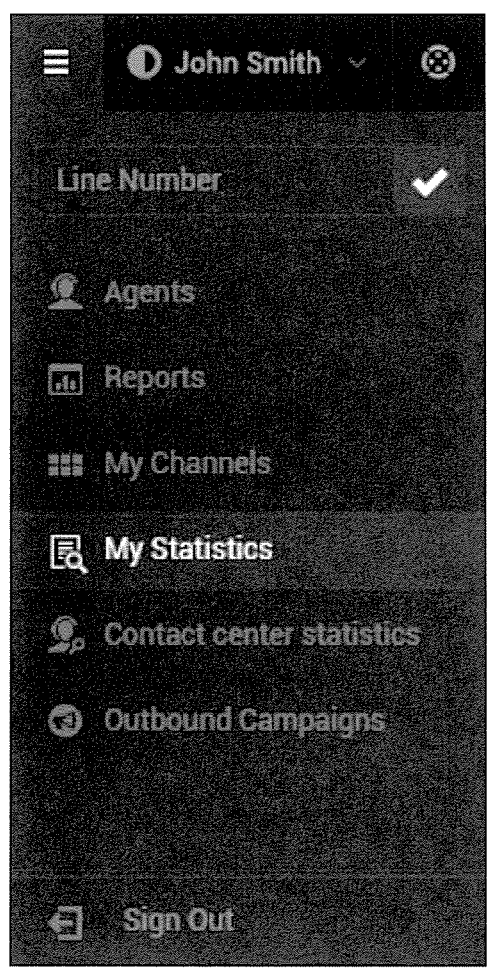
Figure 21F:
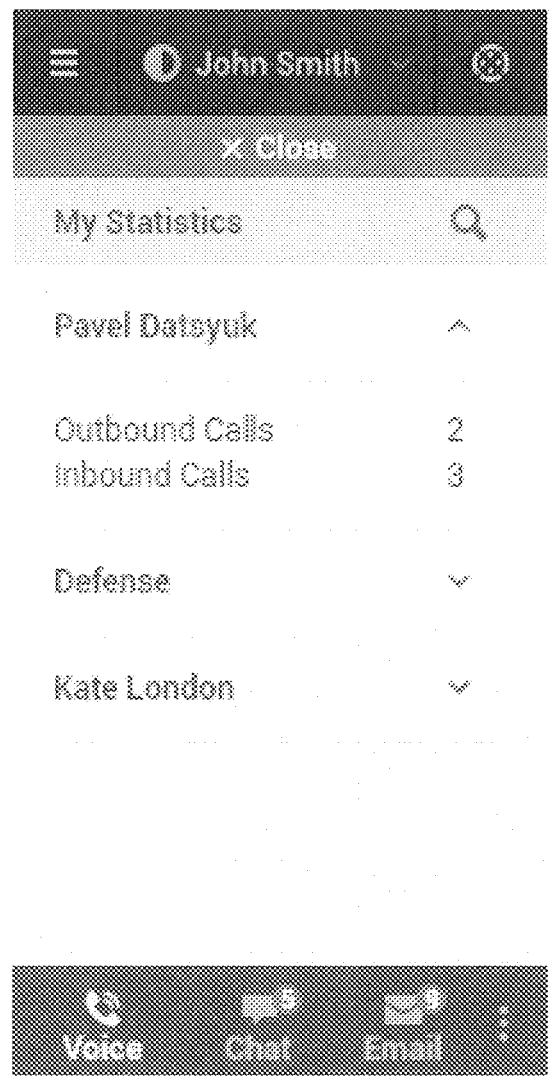
Figure 21G:
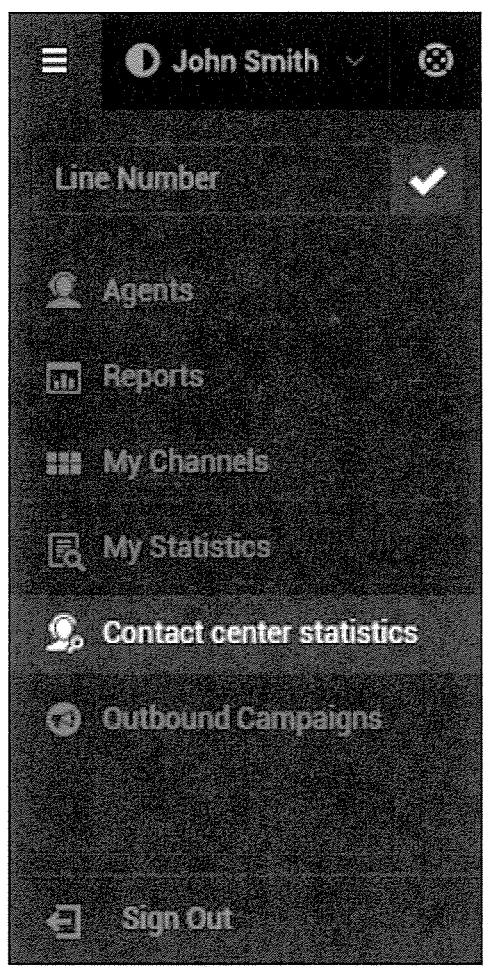
Figure 21H:
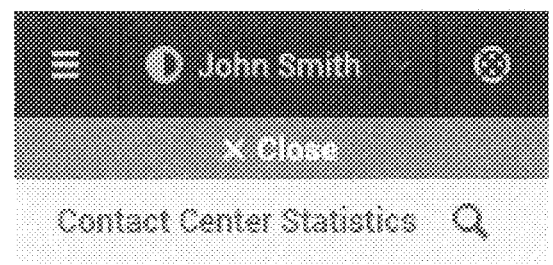
Figure 21H:

FIGS. 21A-21H are screen shots of reports and statistics of a mobile application according to an embodiment of the invention. According to an embodiment, the management interaction module is configured to provide various reports, including but not limited to "My Call Activity," "My Chat Activity," "My Work Item Activity," "Calls in Queue One," and "My Handle Time." As shown in FIGS. 21A-21C, each report screen includes right and left chevrons on respective sides of the screen and bullets near the bottom of the screen (e.g., above the global channel bar) for scrolling through the displayed reports. Statistics may be represented in a number of ways, including, for example, via a graphical representation as shown in FIGS. 21A and 21B and via a horizontal bar chart as shown in FIG. 21C. The chart in FIG. 21C provides data such as the amount of time an agent spends across different activities, including Talk (e.g., engaged in a voice interaction), Ready (e.g., waiting for an interaction), Hold (e.g., placing an interaction on hold), or Wrap-up (e.g., concluding a voice interaction). As shown in FIGS. 21E and 21G, according to an embodiment a main menu may further include a My Statistics icon and a Contact center statistics icon for providing quick access to the reports shown in FIGS. 21F and 21H, respectively.

Although various embodiments of the present invention are described in terms of a mobile application installed on a mobile device, a person of skill in the art should recognize that embodiments are not limited to mobile devices or applications. Instead, embodiments of the present invention extend to any consumer electronics device conventional in the art, such as, for example, televisions, gaming consoles, computers, and the like. Similarly, the application may extend to include any application that may be downloaded and/or executed (e.g. without download) by the consumer electronics device.

Each of the various servers, controllers, switches, gateways, engines, and/or modules (collectively referred to as servers) in the afore-described figures may be a process or thread, running on one or more processors, in one or more computing devices 1500 (e.g., FIG. 22A, FIG. 22B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 22A:
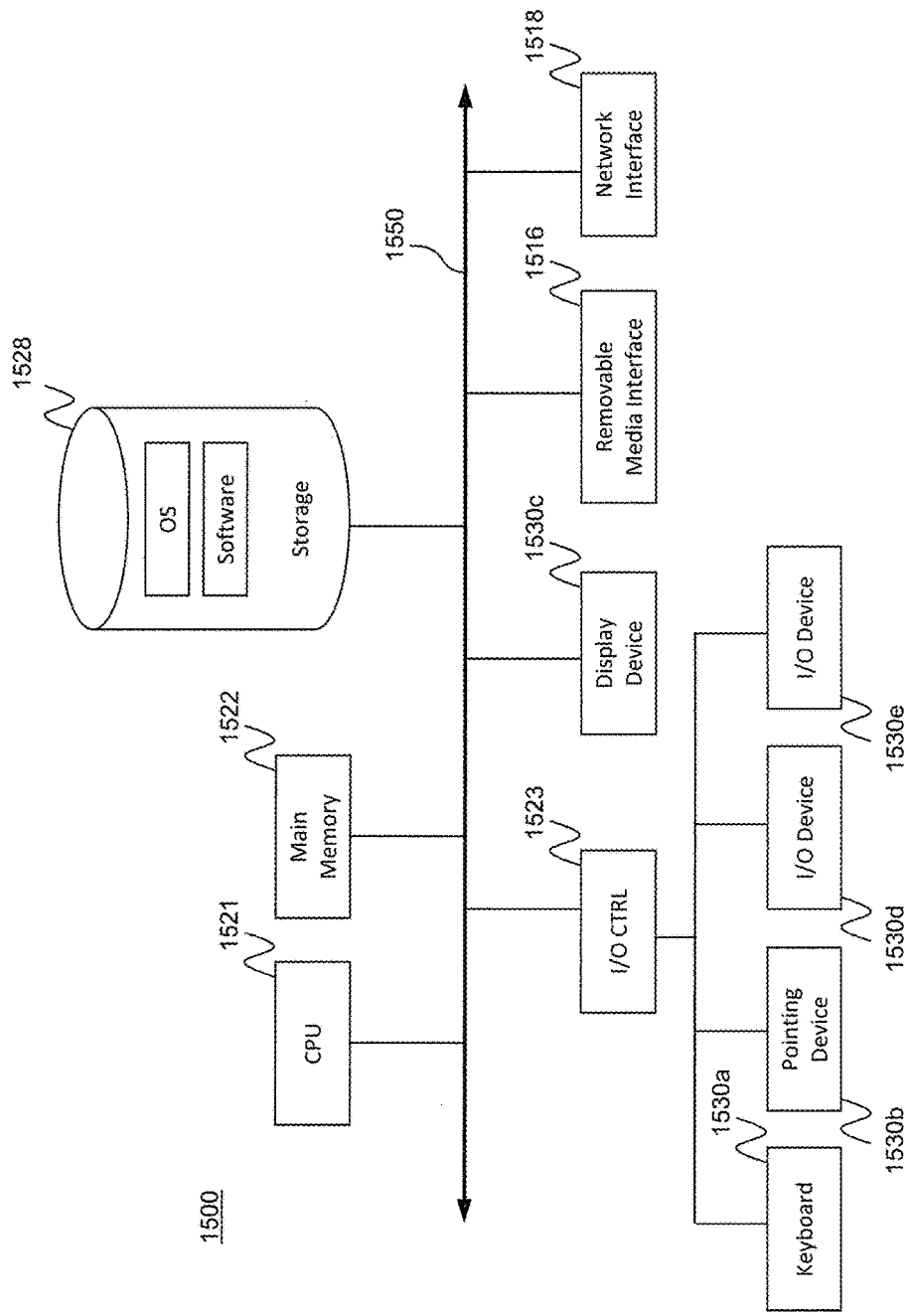
FIG. 22A is a block diagram of a computing device according to an embodiment of the present invention.
Figure 22B:
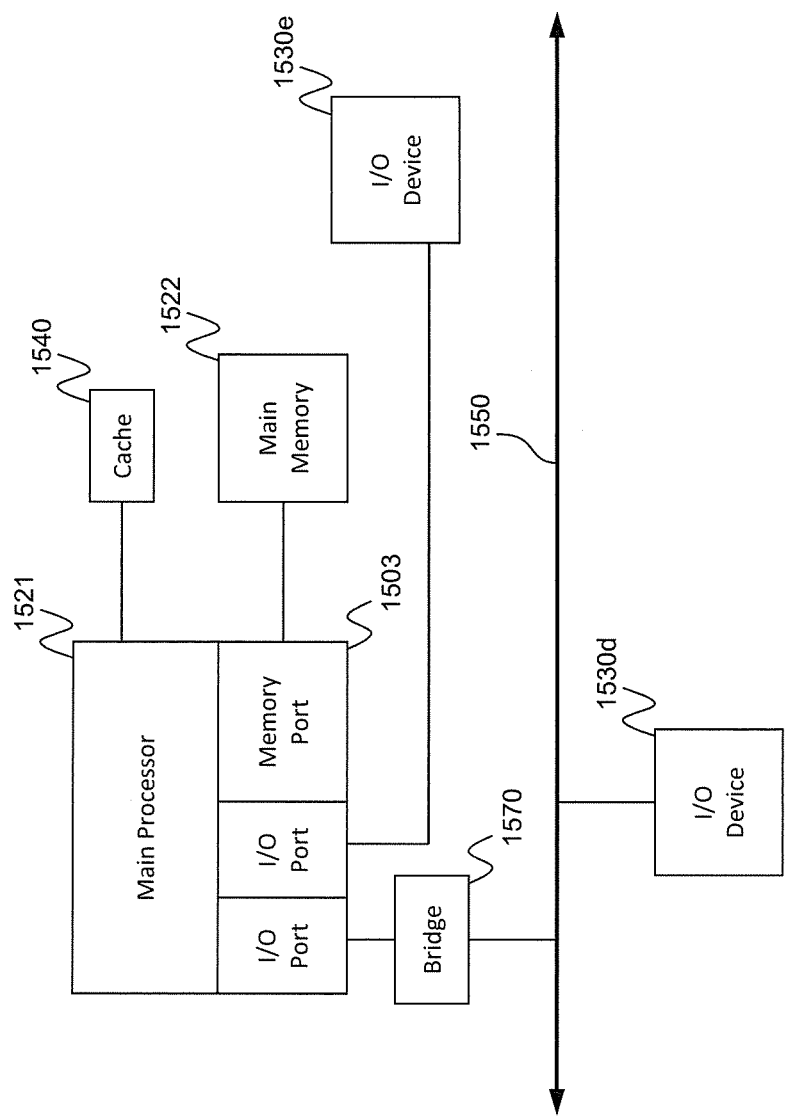
FIG. 22B is a block diagram of a computing device according to an embodiment of the present invention.

FIG. 22A and FIG. 22B depict block diagrams of a computing device 1500 as may be employed in exemplary embodiments of the present invention. Each computing device 1500 includes a central processing unit 1521 and a main memory unit 1522. As shown in FIG. 22A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 22B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 22A, the central processing unit 1521 communicates with the main memory 1522 via a system bus 1550. As shown in FIG. 22B, the central processing unit 1521 may also communicate directly with the main memory 1522 via a memory port 1503.

FIG. 22B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 22A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 22B depicts an embodiment of a computer 1500 in which the central processing unit 1521 communicates directly with I/O device 1530e. FIG. 22B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 22A, may control the I/O devices. The I/O controller may control one or more I/O devices such as a keyboard 1530a and a pointing device 1530b, e.g., a mouse or optical pen.

Referring again to FIG. 22A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 22A and FIG. 22B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 22D:
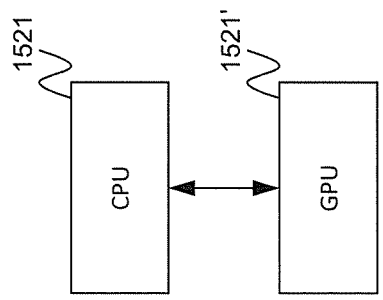
FIG. 22D is a block diagram of a computing device according to an embodiment of the present invention.
Figure 22C:
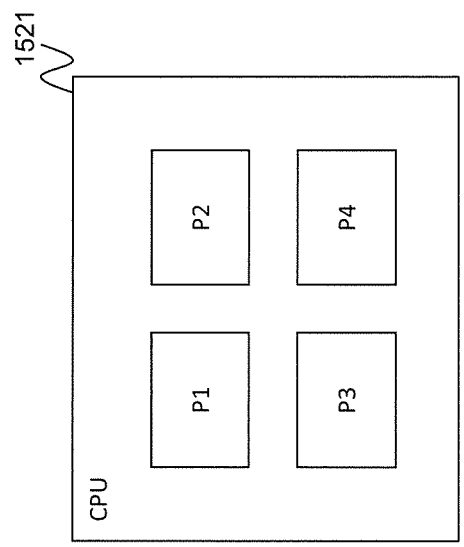
FIG. 22C is a block diagram of a computing device according to an embodiment of the present invention.

As shown in FIG. 22C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 22D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 22E:
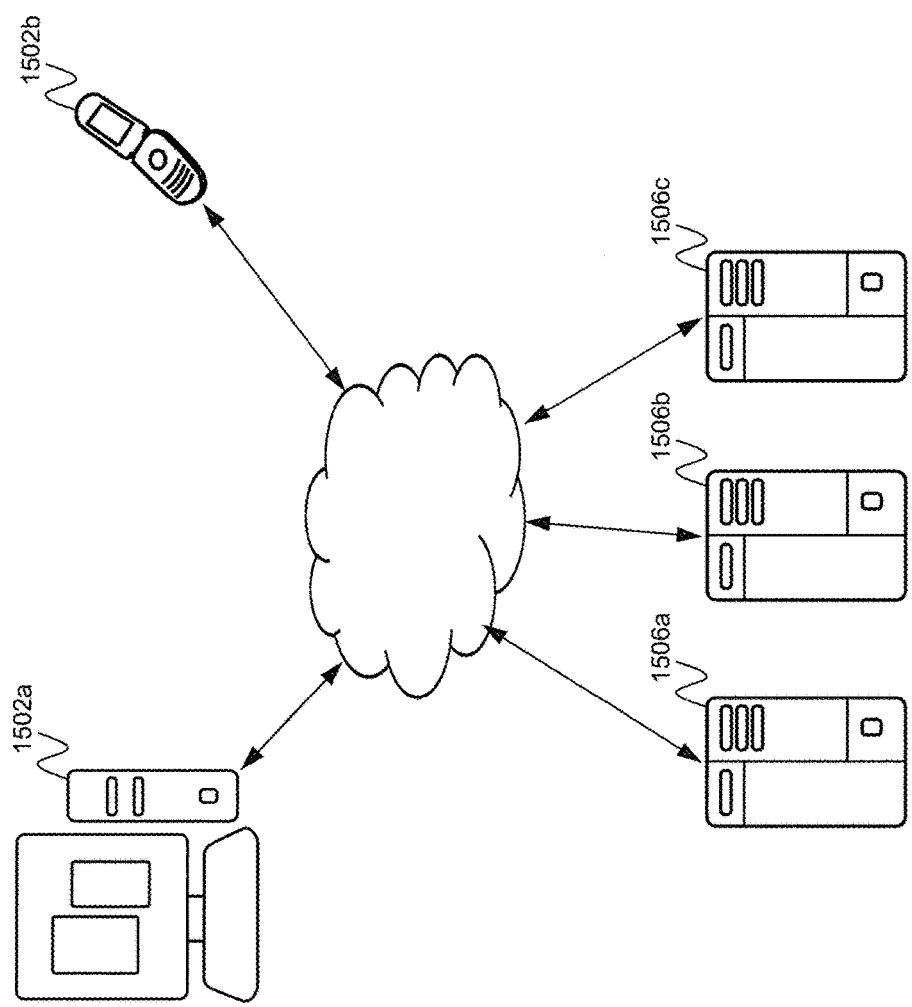
FIG. 22E is a block diagram of a network environment including several computing devices according to an embodiment of the present invention.

A computing device may be one of a plurality of machines connected by a network, or it may comprise a plurality of machines so connected. FIG. 22E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 22E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 22E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

What is claimed is:

1. A system for managing interactions for a customer contact center, the system comprising:
 a display screen;
 a processor; and
 a memory, wherein the memory stores instructions that, when executed by the processor, cause the processor to:
  identify a first real-time interaction for the customer contact center between a first user and a second user over a first communication medium, wherein the first real-time interaction is a first voice or text-based conversation between the first user and the second user;
  display details of the first real-time interaction in a first area of a display screen;
  during the first real-time interaction, identify a request for a second real-time interaction for the customer contact center between the first user and a third user over a second communication medium, wherein the second real-time interaction is a second voice or text-based conversation between the first user and the third user;
  in response to the request, establish the second real-time interaction between the first user and the third user;
  while the details of the first real-time interaction are displayed in the first area when both the first and second real-time interactions are active, display a single icon on the first area, the single icon representing the second real-time interaction, wherein attributes of the single icon correspond to attributes of the second real-time interaction;
  modify the attributes of the icon based on a status of the second real-time interaction;
  receive actuation of the single icon;
  in response to the actuation of the single icon, transition from the first real-time interaction to the second real-time interaction, wherein transitioning to the second real-time interaction leaves the first voice or text-based conversation; and
  in response to the transition from the first real-time interaction to the second real-time interaction, replace display of details of the first real-time interaction with display of details of the second real-time interaction, wherein the details of the second real-time interaction substantially fill the first area;
  identify a desired handing time for the second-real time interaction;
  calculate a falling rate based on the desired handling time; and
  automatically move the icon based on the calculated falling rate.

2. The system of claim 1, wherein the attributes of the icon comprise at least one of a color, size, shape, orientation, position, and a dynamic movement feature of the icon on the display screen.

3. The system of claim 1, wherein the status is based on a Key Performance Indicator (KPI).

4. The system of claim 3, wherein the instructions, when executed, further cause the processor to display movement of the icon based on progress of the second interaction relative to the KPI.

5. The system of claim 4, wherein the KPI relates to at least one of a wait time threshold, interaction duration, and service levels.

6. The system of claim 1, wherein a graphical presentation of the clon is transparent and the icon is displayed on the first area while the first interaction occupies the first area.

7. The system of claim 1, wherein the attributes of the icon correspond to a priority level of the second interaction.

8. The system of claim 1, wherein the instructions, when executed, further cause the processor to transfer the second interaction to a fourth user in response to a drag-and-drop action being performed on the icon, the instructions further causing the processor to detect selection of the icon;

detect dropping of the icon to an identifier of the fourth user, and establish, in response to detecting the dropping of the icon a third voice or text-based conversation between the second user and the fourth user based on the identifier.

9. The system of claim 1, wherein the icon comprises an embedded control for muting or disconnecting the second interaction.

10. The system of claim 9, wherein a graphical presentation of the icon comprises a button for activating the embedded control.

11. The system of claim 1, wherein the instructions, when executed, further cause the processor to retrieve an interaction object associated with the icon in response to dropping of the icon by the first user.

12. A method of managing interactions for a customer contact center, the method comprising:

identifying, by one or more processors, a first real-time interaction for the customer contact center between a first user and a second user over a first communication medium, wherein the first real-time interaction is a first voice or text-based conversation between the first user and the second user;

displaying, by the one or more processors, details of the first real-time interaction in a first area of a display screen of the user device;

during the first real-time interaction, identifying, by the one or more processors, a request for a second real-time interaction for the customer contact center between the first user and a third user over a second communication medium, wherein the second real-time interaction is a second voice or text-based conversation between the first user and the third user;

in response to the request, establishing, by the one or more processors, the second real-time interaction between the first user and the third user;

while the details of the first real-time interaction are displayed in the first area, when both the first and second real-time interactions are active, displaying, by the one or more processors, a single icon on the first area, the single icon representing the second real-time interaction, wherein attributes of the single icon correspond to attributes of the second-real-time interaction;

modifying, by the one or more processors, the attributes of the icon based on a status of the second real-time interaction;

receiving actuation of the single icon;

in response to the actuation of the single icon, transitioning, by the one or more processors, from the first real-time interaction to the second real-time interaction, wherein transitioning to the second real-time interaction leaves the first voice or text-based conversation; and in response to the transitioning from the first real-time interaction to the second real-time interaction, replacing, by the one or more processors, display of details of the first real-time interaction with display of details of the second real-time interaction, wherein the details of the second real-time interaction substantially fill the first areas identifying a desired handling time for the second-real time interaction;

calculating a falling rate based on the desired handling time; and automatically moving the icon based on the calculated falling rate.

13. The method of claim 12, wherein the attributes of the icon comprise at least one of a color, size, shape, orientation, position, and a dynamic movement feature of the icon on the display screen.

14. The method of claim 12, wherein the status is based on a Key Performance Indicator (KPI).

15. The method of claim 14, further comprising displaying, by the one or more processors, movement of the icon based on progress of the second interaction relative to the KPI.

16. The method of claim 15, wherein the KPI relates to at least one of a wait time threshold, interaction duration, and service levels.

17. The method of claim 12, wherein a graphical presentation of the icon is transparent and the displaying the icon on the first area comprises displaying the icon on the first area while the first interaction occupies the first area.

18. The method of claim 12, wherein the attributes of the icon correspond to a priority level of the second interaction.

19. The method of claim 12, further comprising transferring, by the one or more processors, the second interaction to a fourth user in response to a drag-and-drop action being performed on the icon, the method further comprising:

detecting selection of the icon;

detecting dropping of the icon to an identifier of the fourth user; and establishing, in response to detecting the dropping of the icon, a third voice or text-based conversation between the second user and the fourth user based on the identifier.

20. The system of claim 1, wherein the first communication medium and second communication medium are different types of communication medium.

* * * * *